United States Patent
Parker et al.

(10) Patent No.: US 10,398,241 B2
(45) Date of Patent: Sep. 3, 2019

(54) VALVE ASSEMBLY

(71) Applicant: Jackel International Limited, Northumberland (GB)

(72) Inventors: Richard Parker, Newcastle Upon Tyne (GB); James Roe, Glossop (GB); Jason Roebuck, Glossop (GB); Matthew O'Brien, Newcastle Upon Tyne (GB); Peter Angus, Newcastle Upon Tyne (GB)

(73) Assignee: JACKEL INTERNATIONAL LIMITED, Northumberland (GB)

( * ) Notice: Subject to any disclaimer, the term of this patent is extended or adjusted under 35 U.S.C. 154(b) by 0 days.

(21) Appl. No.: 14/570,476

(22) Filed: Dec. 15, 2014

(65) Prior Publication Data

US 2015/0208838 A1  Jul. 30, 2015

(30) Foreign Application Priority Data

Jan. 29, 2014 (GB) .............................. GB1401497.1
Jun. 19, 2014 (GB) .............................. GB1410978.9

(51) Int. Cl.
*A47G 19/22* (2006.01)
*B65D 47/20* (2006.01)
*F16K 15/14* (2006.01)

(52) U.S. Cl.
CPC ..... *A47G 19/2272* (2013.01); *A47G 19/2266* (2013.01); *B65D 47/2031* (2013.01);
(Continued)

(58) Field of Classification Search
CPC ............ A47G 19/2272; A47G 19/2266; B65D 47/2031
(Continued)

(56) References Cited

U.S. PATENT DOCUMENTS 3,102,651 A  9/1963  Boese
3,739,938 A  6/1973  Paz
(Continued)

FOREIGN PATENT DOCUMENTS

AU  2003200233 A  6/2009
CN  102506201 A  6/2012
(Continued)

OTHER PUBLICATIONS

United Kingdom Intellectual Property Search Report for Application No. GB1401497.1, which is priority application for U.S. Appl. No. 14/570,476, dated Jul. 18, 2014.
(Continued)

*Primary Examiner* — Jeffrey R Allen
*Assistant Examiner* — Jennifer Castriotta
(74) *Attorney, Agent, or Firm* — Olson & Cepuritis, Ltd.

(57) ABSTRACT

According to a first embodiment, the valve assembly comprises a first arm having a first valve portion and a second arm having a second valve portion. The valve assembly is foldable from an unfolded state to a folded state, such that the first valve portion engages with the second valve portion. According to a second embodiment, the valve assembly comprises a liquid inlet, a liquid outlet, a conduit, a blocking member, and a flexible member arranged to seal against the blocking member. The conduit comprises at least one bend and is arranged such that fluid may flow from the liquid inlet, past the bend and through the liquid outlet to at least indirectly impinge the flexible member.

19 Claims, 24 Drawing Sheets

(52) U.S. Cl.
CPC ........ *B65D 47/2062* (2013.01); *F16K 15/144* (2013.01); *Y10T 29/49405* (2015.01)

(58) Field of Classification Search
USPC .............. 215/311, 11.5, 11.6, 11.4; 220/714, 220/203.29, 203.28, 203.19, 203.18, 220/203.17, 203.16, 203.15, 203.14, 220/203.11, 203.07, 203.01
See application file for complete search history.

(56) References Cited

U.S. PATENT DOCUMENTS

| | | | |
|---|---|---|---|
| 4,795,052 | A | 1/1989 | Hayes |
| 5,186,347 | A | 2/1993 | Freeman |
| 5,542,670 | A | 8/1996 | Morano |
| 5,692,627 | A | 12/1997 | Feng |
| 5,706,973 | A | 1/1998 | Robbins, III |
| 5,769,253 | A | 6/1998 | Gross |
| 5,890,620 | A * | 4/1999 | Belcastro ........... A47G 19/2272 215/11.4 |
| 5,890,621 | A | 4/1999 | Bachman |
| 6,053,342 | A | 4/2000 | Chomik |
| 6,102,245 | A | 8/2000 | Haberman |
| 6,116,457 | A | 9/2000 | Haberman |
| 6,325,236 | B1 | 12/2001 | Wong |
| 6,357,620 | B1 * | 3/2002 | Hakim ............... A47G 19/2272 215/11.4 |
| 6,758,364 | B1 | 7/2004 | Rohrig |
| 6,814,639 | B1 | 11/2004 | Peterson |
| 7,070,065 | B2 | 7/2006 | Wong |
| 2001/0035420 | A1 | 11/2001 | Fusco |
| 2001/0042755 | A1 | 11/2001 | Belcastro |
| 2002/0033399 | A1 | 3/2002 | Manganiello |
| 2002/0066741 | A1 | 6/2002 | Rees |
| 2002/0179615 | A1 | 12/2002 | Hakim |
| 2003/0024895 | A1 | 2/2003 | Meyers |
| 2003/0116573 | A1 | 6/2003 | Clark |
| 2003/0178427 | A1 | 9/2003 | Chomik |
| 2003/0209555 | A1 | 11/2003 | Belcastro |
| 2004/0164043 | A1 | 8/2004 | Hakim |
| 2004/0173623 | A1 | 9/2004 | Yuen |
| 2004/0195253 | A1 | 10/2004 | Boucher |
| 2004/0222229 | A1 | 11/2004 | Gabbard |
| 2004/0222230 | A1 | 11/2004 | Samson |
| 2005/0167438 | A1 | 8/2005 | Minyayev |
| 2005/0184075 | A1 | 8/2005 | Belcastro |
| 2006/0108373 | A1 | 5/2006 | Cheng |
| 2008/0149651 | A1 | 6/2008 | Samson |
| 2008/0314933 | A1 | 12/2008 | Leonoff |
| 2009/0020544 | A1 | 1/2009 | Yuen |
| 2009/0212061 | A1 | 8/2009 | Naesje |
| 2010/0147862 | A1 | 6/2010 | Keefe |
| 2010/0294764 | A1 | 11/2010 | Kemper |
| 2011/0089178 | A1 | 4/2011 | Giraud |
| 2011/0121008 | A1 | 5/2011 | Lam |
| 2011/0198309 | A1 | 8/2011 | Itzek |
| 2013/0026196 | A1 | 1/2013 | Essebaggers |
| 2014/0001192 | A1 | 1/2014 | Steininger |

FOREIGN PATENT DOCUMENTS

| | | |
|---|---|---|
| DE | 29706653 U1 | 7/1997 |
| EP | 0099964 A2 | 2/1984 |
| EP | 1374826 A1 | 1/2004 |
| EP | 1486708 A1 | 12/2004 |
| FR | 2863590 A1 | 6/2005 |
| GB | 2317608 A | 4/1998 |
| JP | 2002321755 A | 11/2002 |
| JP | 2010006453 A | 1/2010 |
| WO | 0197663 A1 | 12/2001 |
| WO | 2013034246 A1 | 3/2013 |
| WO | 13062575 A1 | 5/2013 |
| WO | 13079932 A1 | 6/2013 |
| WO | 2014066474 A1 | 5/2014 |

OTHER PUBLICATIONS

United Kingdom Intellectual Property Search Report for Application No. GB1410978.9, which is priority application for U.S. Appl. No. 14/570,476, dated Dec. 8, 2014.
United Kingdom Intellectual Property Search Report for Application No. GB1501384.0, which is foreign counterpart for application for U.S. Appl. No. 14/570,476, dated Jun. 1, 2015 (Claims 11-34).
United Kingdom Intellectual Property Search Report for Application No. GB1501384.0, which is foreign counterpart application for U.S. Appl. No. 14/570,476, dated Jun. 1, 2015.
United Kingdom Intellectual Property Examination Search Report, dated Aug. 30, 2017, with respect to Application No. GB1501384.0, which is a foreign counterpart application for U.S. Appl. No. 14/570,476.
International Search Report, dated Jul. 14, 2015, with respect to PCT/EP2015/051728.
Australian Examination Report; dated Dec. 4, 2018; 4 pages.

* cited by examiner

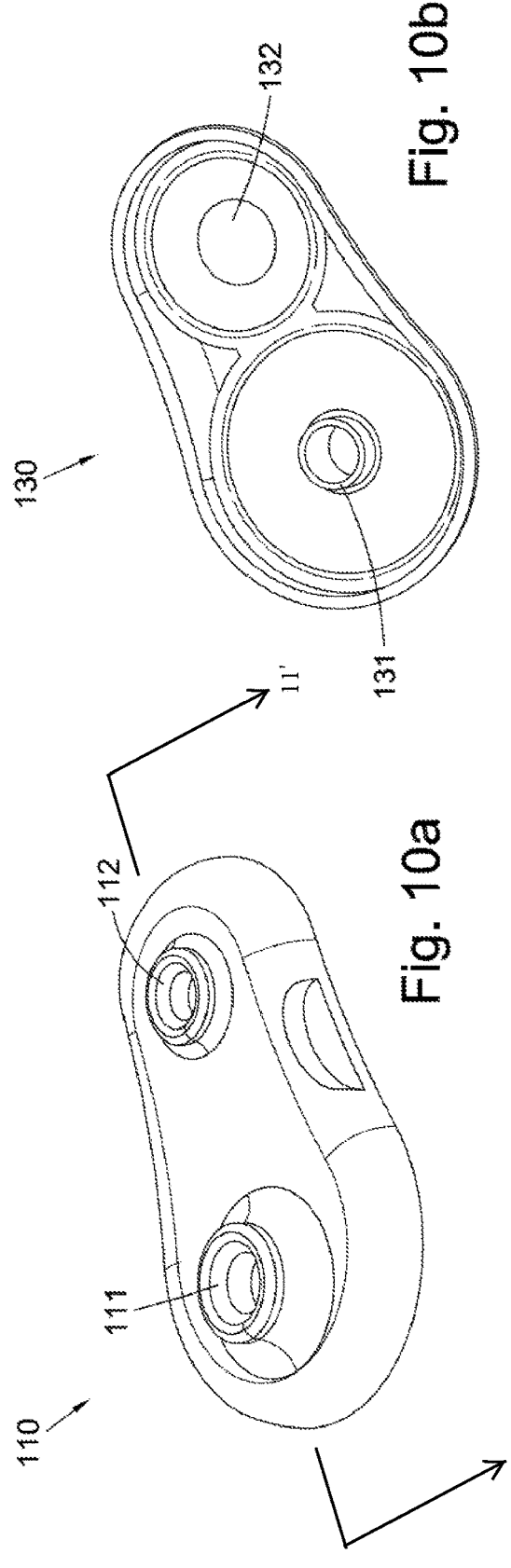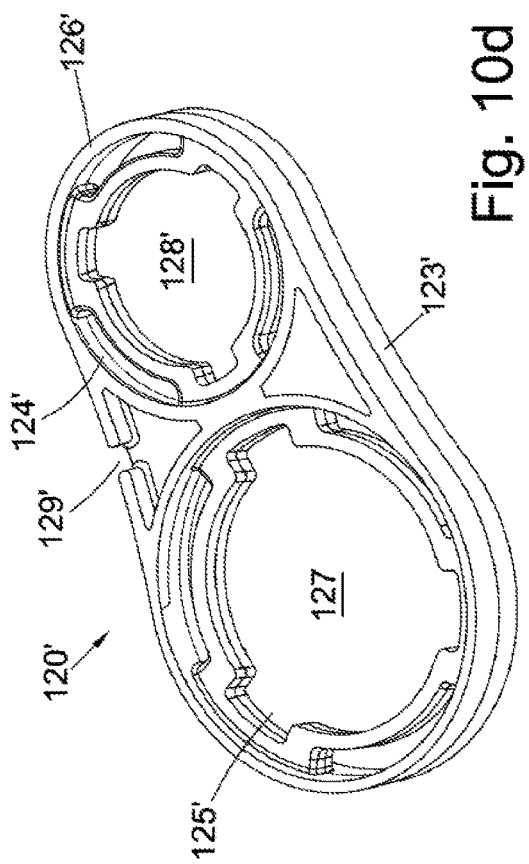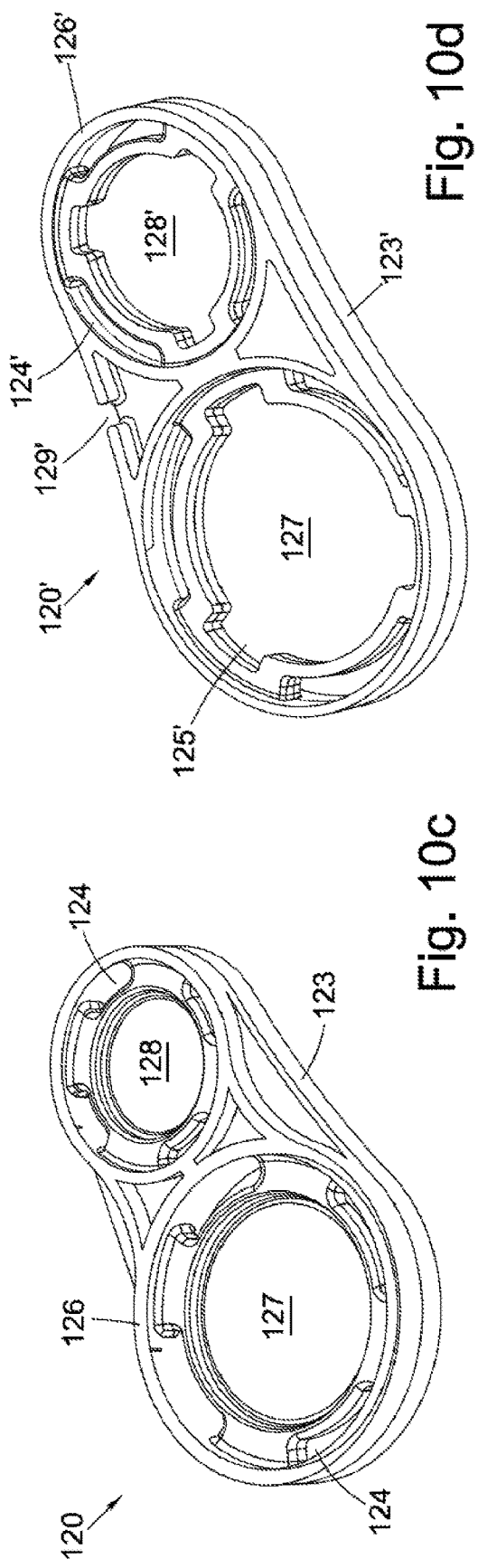

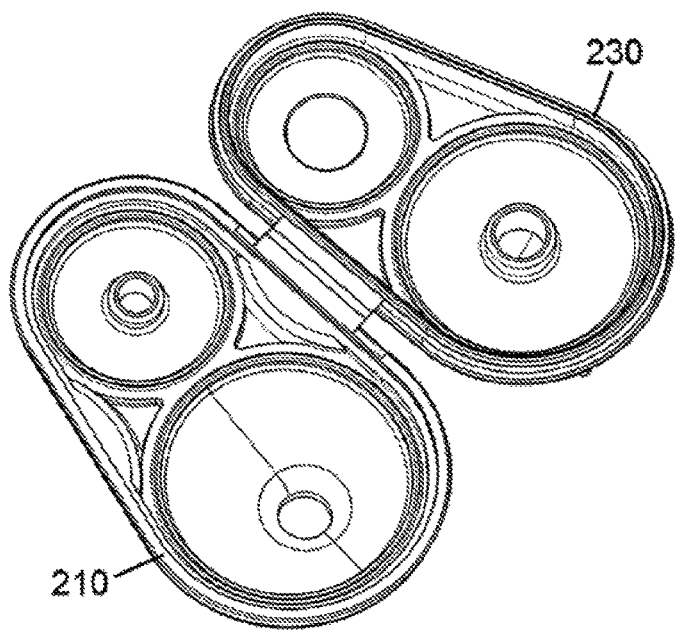
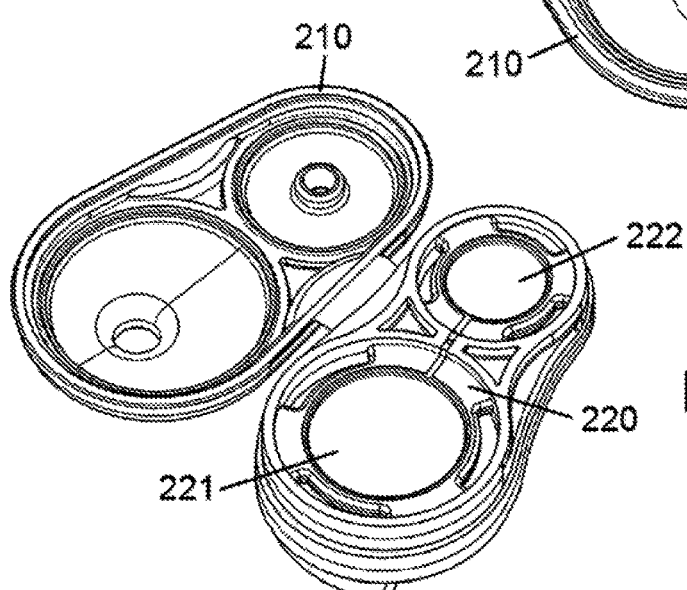
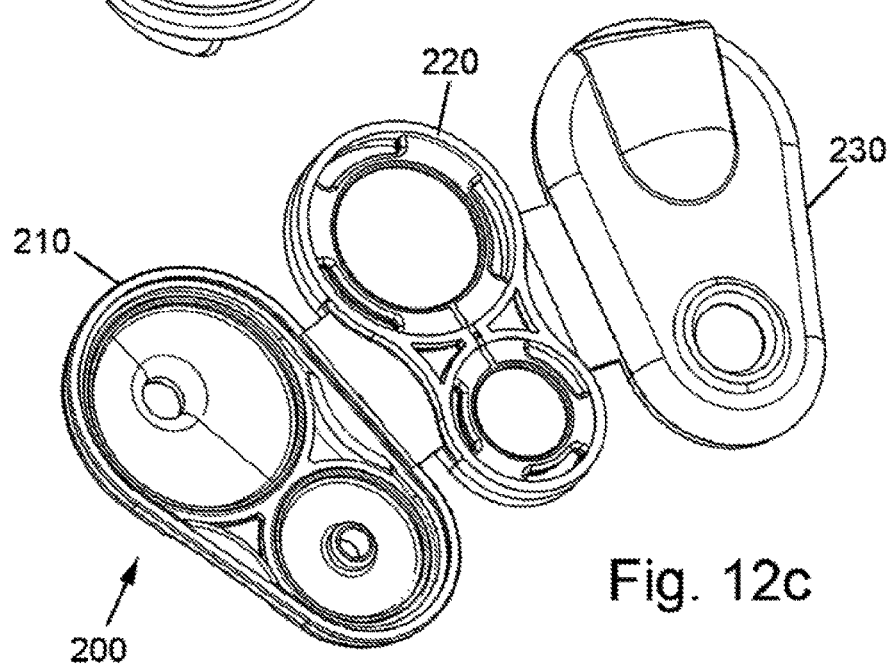
Fig. 12a
Fig. 12b
Fig. 12c

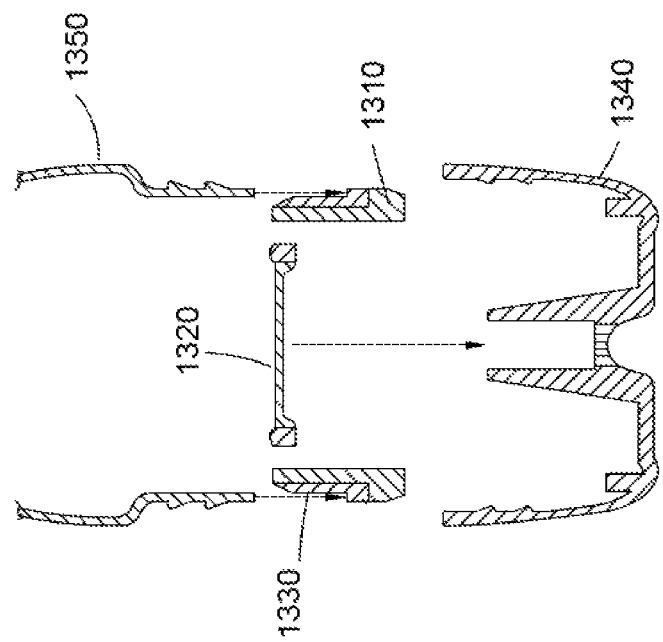
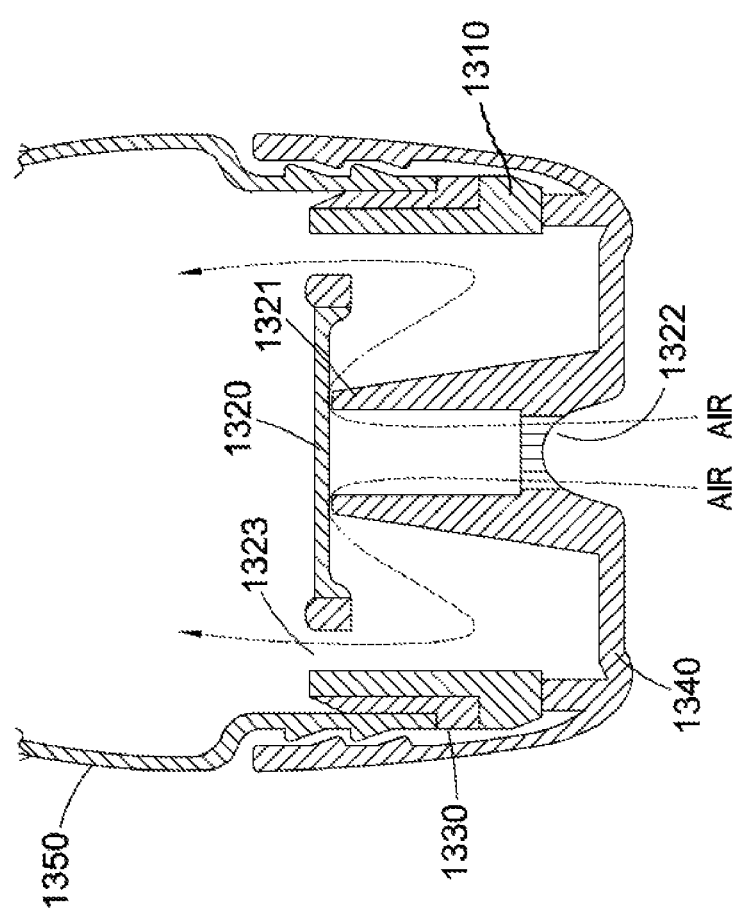
Fig. 13b
Fig. 13a

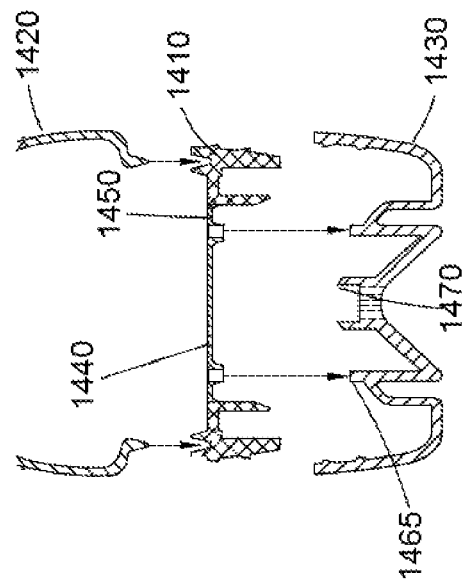
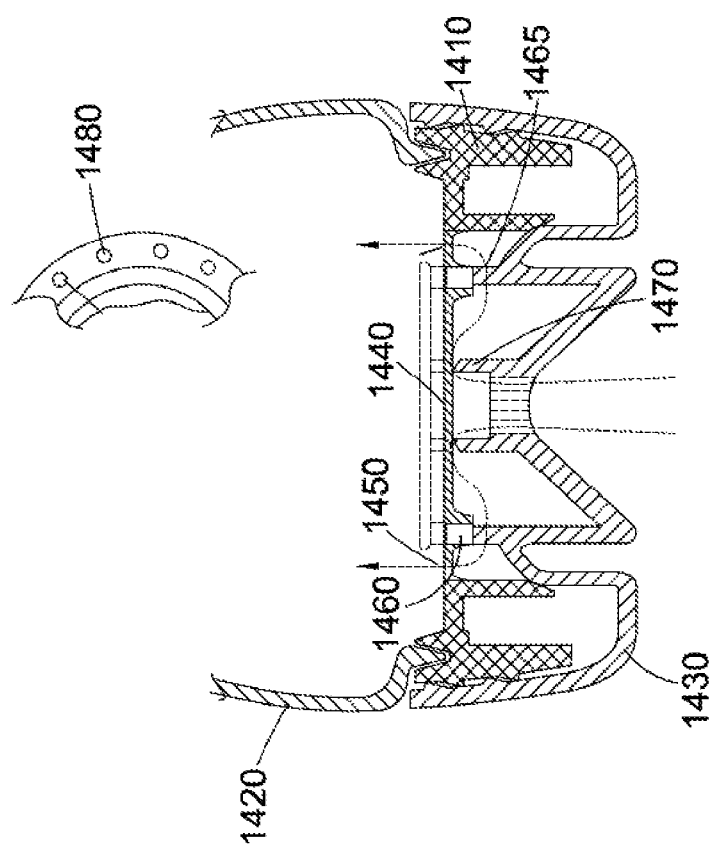
Fig. 14a
Fig. 14b

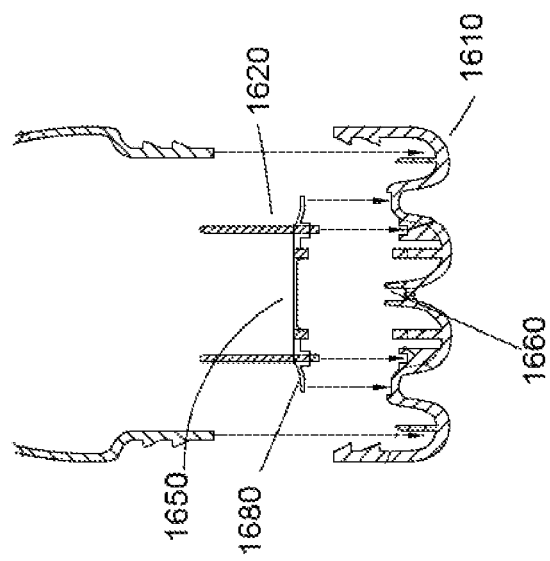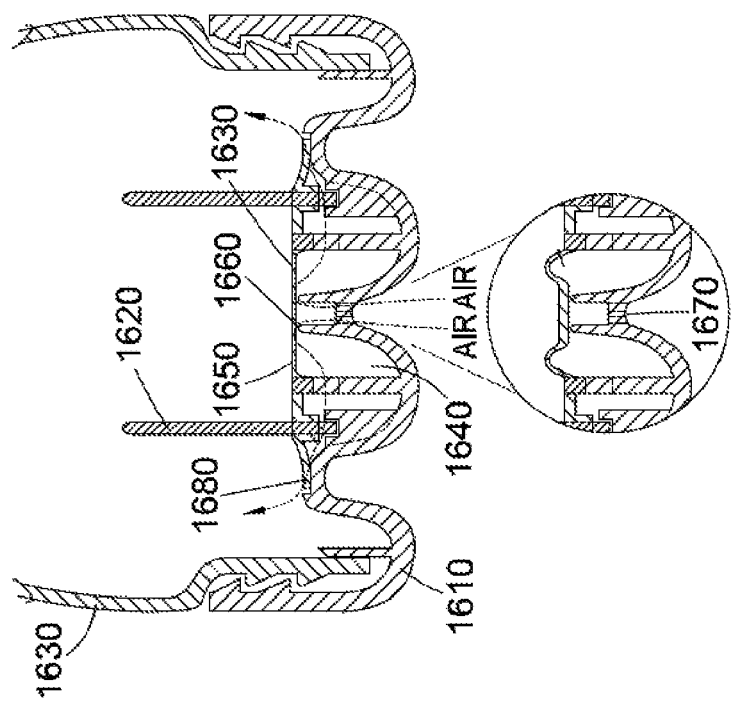
Fig. 16a
Fig. 16b

VALVE ASSEMBLY

CROSS-REFERENCE TO RELATED APPLICATIONS

This application is based on and claims under 35 U.S.C. § 119(a) the benefit of UK Application No. GB1401497.1, filed on Jan. 29, 2014 in the Intellectual Property Office of the United Kingdom, the disclosure of which is incorporated herein by reference.

This application also claims the benefit of UK Application No. GB1410978.9, filed on Jun. 19, 2014 in the Intellectual Property Office of the United Kingdom, the disclosure of which is incorporated herein by reference.

FIELD OF THE INVENTION

The present invention relates to a valve assembly, and in particular to a valve assembly for a drinking cup. In some embodiments, the invention relates to a novel valve assembly for use with a no-spill infant drinking cup.

BACKGROUND OF THE INVENTION

It is common for infant cup valve assemblies, and their respective components, to be formed from various types of plastic, and as such injection moulding is a common manufacturing method. However, valve assemblies often comprise complex arrangements of small components. This has traditionally led to the components being moulded separately and subsequently being assembled during manufacture to form the completed valve assembly. Thus, different moulds are required depending on the size, form and desired type of material to be used when forming the valve assembly components. These parts may then need to be glued or otherwise coupled together during manufacture. For example, in EP2134617B1, there is described a no-spill infant cup valve assembly. The assembly, however, consists of at least two separately moulded parts, and therefore requires at least one assembly step during the manufacturing process. In addition, the valve requires the user to reassemble it by coordinating small locating features every time the valve is removed for cleaning; failure to reassemble the valve correctly results in liquid leaking from the cup. Clearly, therefore, there is a need for both an improved method of manufacture, and a simpler valve assembly, which can benefit from reduced cost and manufacturing time.

One type of well-known drinking cup is the so-called no-spill drinking cup, suitable for infant usage. The aim of a no-spill cup and associated valve is to provide a cup which allows the contents of the cup to escape through the valve only upon usage by the user, for example via the application of suction. Suction-operated valves may sometimes be referred to as 'demand valves' to differentiate them from other non-spill valves, such as 'bite valves', which are opened by the user temporarily deforming the closure device with their teeth or lips to allow liquid to escape. A demand valve incorporated into a no-spill cup should therefore prevent the contents of the cup from escaping when for example when the cup is vigorously shaken, when the cup is inverted, or when the cup is accidentally dropped. However, there is always a risk that such a valve having, for example, a flexible component designed to move in response to a pressure differential can be easily deformed by the impact of liquid on the component, which often occurs during such shaking or dropping. Thus, undesirable leakage can occur. Conversely, a user should not have to apply excessive suction in order to open the valve. There is therefore a need in the art for a valve assembly suitable for a drinking cup in which an improved seal is provided, whilst ensuring that a user is not inconvenienced when using the drinking cup.

In EP2134617B1, the closure element relies on a stem that passes through the same channel that the liquid flows through. There is therefore only a small space around the stem for liquid to flow and flow rate is limited accordingly. If the stem were made narrower (to allow more water to flow around it), there may not be sufficient closure force on the 'mushroom head' to seal the valve closed, and the mushroom head may become difficult to install by pushing through the channel. Alternatively, if the mushroom head and liquid channel were made larger relative to the stem, to accommodate more flow, then the head may become too flexible to cap the channel inlet.

It is also a known problem with demand valves that control liquid flow via a slit in a flexible material that they have a tendency to 'heal' (see for example EP1014839B1). This can affect, for example, slits in silicone diaphragms and may mean that the material can repair itself during shipping so that the user finds difficulty in getting the valve to work when they first try to use it.

The present invention seeks to address these and other disadvantages encountered in the prior art, by providing an improved valve assembly for a drinking cup.

SUMMARY OF THE INVENTION

In a first aspect of the present invention, there is provided a valve assembly for a drinking cup. The valve assembly comprises a first arm having a first valve portion and a second arm having a second valve portion. Each valve portion has a respective aperture for fluid flow. The valve assembly is foldable from an unfolded state to a folded state, such that the first arm is moveable relative to the second arm. This allows the first valve portion to be engaged with the second valve portion to form, in the folded state, a fluid flow path between the first and second apertures.

The inventive valve assembly, hereinafter referred to as an assembly, chassis or frame, may be used with any type of drinking cup or vessel, such as an infant drinking cup or beaker. The valve assembly may be particularly well suited for use with a no-spill drinking cup as described above. The provision of first and second arms, which may take a variety of forms and structures, may allow the assembly to be moulded in a single part according to known techniques. The arms of the assembly may also be referred to as, for example, extending members, appendages, attachments or limbs. In an embodiment of the present invention, one arm is arranged to couple to the lid of the drinking cup. The other arm is arranged to couple to the first arm.

The first and second valve portions may be sub-components or sub-units of a completed valve. For example, one of the valve portions may comprise a valve seat whilst the second valve portion may be arranged to receive a flexible valve face. Only when the first and second valve portions are brought together may the two function together as a completed valve. The valve portions may be located at any position on their respective arms such that when one arm is moved relative to the other the valve portions may be brought into engagement.

Each valve portion may comprise one or more apertures formed therein. In particular, the apertures may be designed such that, when the first and second valve portions are brought into engagement, only some of the apertures may be arranged to allow fluid flow therethrough, whilst others may be designed to be sealed off with a flexible member or other diaphragm.

The folding of the first arm relative to the second arm may take place along a predetermined fold line or other point along which folding, rotating or bending may take place. The engagement of the first valve portion with the second valve portion may comprise a non-fixed joining or contacting of the two valve portions, or may also comprise more permanent attachment such as coupling or fixed connection of one valve portion to the other.

The assembly may also comprise a third arm. The valve assembly may be further foldable such that the third arm is moveable relative to the first and second arms. The third arm may be rotated or moved relative to the first arm, the second arm, or both. The third arm may also be joined to only of the first and second arms, or both.

The third arm may also comprise a locking mechanism for locking the first and second valve portions together in the folded state. The provision of a locking mechanism may prevent the first and second arms from detaching or springing apart post-assembly. Even without the locking mechanism, the engagement of the third arm with the first and/or second arms may serve to reinforce the coupling or engagement of the first and second valve portions. The third arm may incorporate a spout, and may also incorporate attachment means to a drinking cup.

The third arm may comprise a third aperture. In the folded state, the third arm may engage at least one of the first and second valve portions to form a fluid flow path between the first, second and third apertures. Thus, when in the folded state, a fluid flow path may be formed through the valve assembly, running from each of the apertures of the first and second valve portions and the third arm.

In the folded state, the first and second valve portions may be detachably interlocked, for example, with a locking tab and clasp, or by other means known in the art. Advantageously, when a user wishes to clean the valve components, the locking mechanism may be disengaged and the assembly reverted to its unfolded state for cleaning. Such unfolding is generally a simple process. The valve assembly components can then be cleaned, and the assembly can be easily returned to the folded state.

In the folded state the first and second valve portions may be engaged to form a demand valve. A demand valve may be defined as a valve that switches from a closed to an open configuration due to suction.

A length of the fluid flow path may be less than a width of the valve assembly. Other lengths of fluid flow paths are contemplated within the scope of this disclosure. Thus, the inventive assembly may avoid the more tortuous and lengthy flow paths that are associated with prior art valve assemblies. Such tortuous flow paths generally require the sucking out of a lot of air before liquid arrives, and generate a relatively higher amount of drag/friction as a result of their long flow paths.

The valve assembly may further comprise a flexible diaphragm. The flexible diaphragm may be impervious to air and liquid or may comprise at least one aperture. The diaphragm may comprise apertures of different shapes and sizes, positioned at different points on the diaphragm. This set of apertures may correspond to the type in either of the first or second valve portions which is not sealed off with a flexible member or other diaphragm. The diaphragm may also be referred to herein as a membrane, flexible cover, valve face or other such term. The flexible diaphragm may be coupled to one of the first and second arms such that in the folded state the flexible diaphragm may act to block the fluid flow path between the aperture(s) in the first and second valve portions. Thus, when the first and second valve portions are engaged to one another, a completed valve may be formed such that the flexible diaphragm may block the fluid flow path and at times flex so as to open the fluid flow path.

In the folded state, a blocking portion of the flexible diaphragm may act to block the fluid flow path between the first and second apertures. The blocking portion may be spaced from an aperture formed within the flexible diaphragm. The blocking portion may be a central portion of the flexible diaphragm.

In the folded state the flexible diaphragm may be sealingly coupled to at least one of the first and second valve portions. The flexible diaphragm may be positioned so as to seal off the aperture in the first/second valve portion.

The first arm may further comprise a third valve portion. The second arm may further comprise a fourth valve portion. Each of the third and fourth valve portions may have a respective aperture for air flow. Thus, an air valve may be incorporated into the valve assembly.

The valve assembly may be foldable from an unfolded to a folded state such that the first arm is moveable relative to the second arm, to allow the third valve portion to be engaged with the fourth valve portion and to thereby form in the folded state an air flow path between the third and fourth apertures.

The valve assembly may further comprise a second flexible diaphragm. The second flexible diaphragm may comprise at least one aperture. The second flexible diaphragm may be coupled to one of the first and second arms such that in the folded state the second flexible diaphragm acts to block the air flow path between the third and fourth apertures. Thus, much like the first flexible diaphragm, the second flexible diaphragm may combine with the third and fourth valve portions to form a completed valve, such that the second flexible diaphragm may block the fluid flow path and at times flex so as to open the fluid flow path through the third and fourth valve portions.

In the folded state, a blocking portion of the second flexible diaphragm may act to block the air flow path between the third and fourth apertures. The blocking portion being spaced from an aperture formed within the second flexible diaphragm. The blocking portion may be a central portion of the second flexible diaphragm. The blocking portion of the second flexible diaphragm may be selectively further away from a level of liquid in the cup than the blocking portion of the first flexible diaphragm.

The valve assembly may further comprise a gripping member extending away from a plane of the valve assembly. The gripping member may takes various shapes and sizes, and is primarily designed to allow a user to easily handle the valve assembly (especially in its folded state), for example by assisting in engaging or disengaging the valve assembly with a lid of a drinking cup.

In a further aspect of the present invention, there is provided a method of manufacturing a valve assembly for a drinking cup. The method comprises moulding a first arm and a second arm, the first and second arms being coupled to one another. The first arm has a first valve portion and the second arm has a second valve portion. Each valve portion has a respective aperture for fluid flow. A fold line is formed in the valve assembly such that the valve assembly is foldable from an unfolded state to a folded state, and such that the first arm is moveable relative to the second arm to allow the first valve portion to be engaged with the second valve portion. A fluid flow path is therefore formed between the first and second apertures.

Advantageously, the fold line allows the first arm to be moved relative to the second arm so as to bring valve portions into engagement with one another. According to this method, a relatively complex valve may therefore be formed in a single moulding process. By forming the valve as different valve portions located on different arms, the valve portions can then be brought together and engaged without the need to manufacture them as separate, individual parts.

The method may further comprise moulding a first flexible diaphragm such that the first flexible diaphragm is coupled to the first arm.

The method may further comprise moulding a second flexible diaphragm such that the second flexible diaphragm is coupled to the first or second arm.

The first and second arms may comprise a first material, such as a rigid plastic, for example polypropylene. The first and/or second flexible diaphragms may comprise a second, different material, such as a thermoplastic elastomer or silicone.

In a further aspect of the invention, there is provided a method of using a valve assembly as described above. The method comprises folding the valve assembly so as to move the first arm relative to the second arm. The first valve portion is thus brought into engagement with the second valve portion to form a fluid flow path between the first and second apertures.

In a further aspect of the invention, there is provided a valve assembly for a drinking cup. The valve assembly comprises a liquid inlet, a liquid outlet, a blocking member, and a flexible member arranged to seal against the blocking member. The valve assembly further comprises a conduit extending from the liquid inlet to the liquid outlet. The conduit comprises at least one bend and is arranged such that fluid may flow from the liquid inlet, past the bend and through the liquid outlet to at least indirectly impinge the flexible member.

The blocking member may be any component or member arranged to prevent the flow of liquid therethrough, and for example is impervious to the passage of a liquid. The flexible member may take different shapes and forms and may be arranged to form a seal at least a portion of the blocking member. The bend acts as a baffle and may comprise any feature of the conduit designed to induce a not insubstantial deviation in a flow path defined by the conduit, such that a liquid flowing through the conduit will undergo a velocity change. The bend may be curved or straight in nature. The bend may have any suitable angle, and in one embodiment is a right-angle bend. The conduit may be arranged such that liquid exiting the conduit is directed directly onto the flexible member. Alternatively, the liquid may be directed such that it may rebound off a surface (for example the blocking member) and then in so doing indirectly impinge the flexible member.

Advantageously, the bend or other similar deformation in the conduit reduces the momentum of a liquid flowing through the conduit such that the pressure exerted by the flowing liquid on the flexible member is reduced. Thus, the seal of the flexible member is improved and is weakened less over time through repeated usage of the valve assembly. In prior art valve assemblies, liquid generally impinges the flexible member without any slow-down effect induced by one or more bends in a conduit, which can result in weakening of the seal.

The blocking member may comprise a valve seat having the liquid outlet formed therein. The flexible member may comprise a flexible valve face arranged to seal against the liquid outlet so as to prevent fluid flow therethrough.

The valve assembly may be arranged to couple to a lid of a drinking cup with the liquid inlet located within the drinking cup when the drinking cup is joined to the lid. When suction is applied to a drinking hole of the drinking cup, the flexible member may be caused to lift off the blocking member. Thus, the inventive valve assembly may be incorporated with a drinking cup to provide an improved drinking cup in which the valve's seal is stronger and more durable as a result of the bent conduit.

The conduit may comprise a first section and a second section. The first section may extend from the liquid inlet to the bend, and the second section may extend from the bend to the liquid outlet. Further sections in the conduit may be provided. For example, the conduit may comprise a plurality of bends, each bend acting to slow down the flow of liquid drawn through the conduit as a user applies suction so as to consume the contents of the cup.

The first and second sections may be substantially linear.

The first section may be longer than the second section. In other words, the bend may be located proximal or adjacent to the liquid outlet such that the reduction in speed of the liquid is maximised before the liquid exits through the liquid outlet. In one embodiment, the first section is approximately 13 mm long and the second section is approximately 5 mm long.

A cross-section of the first section may have a smaller surface area than a corresponding cross-section of the second section. Increasing the cross-section of the first section in this manner may further improve the dampening or baffle-like effects of the bend. In one embodiment, the cross-section of the first section is approximately 8 mm$^2$ and the cross-section of the second section is approximately 12.5 mm$^2$.

In a further aspect of the invention, there is provided a valve assembly for a drinking cup. The valve assembly comprises a valve seat having a liquid outlet formed therein. The valve assembly further comprises a flexible valve face having a blocking portion arranged to seal the liquid outlet so as to prevent fluid flow therethrough. The flexible valve face comprises one or more apertures formed therein and spaced from the blocking portion.

Thus, by having a blocking portion of a flexible valve face seal a liquid outlet of the valve, the flexible valve face (and in particular the blocking portion) may flex in the same direction as liquid flowing through the liquid outlet, therefore making it easier for a user to break the seal when using a drinking cup with the inventive valve assembly. Thus, the valve assembly may make it easier for the user to apply suction and open the valve.

The blocking portion may comprise a central portion of the flexible valve face. The blocking portion may impermeable to the passage of liquid. A peripheral portion of the flexible valve face may be fixed to the valve seat. The peripheral portion may be spaced from the blocking portion, and for example may form part of a periphery of the flexible valve face. A periphery of the flexible valve face may be fixed to the valve seat. The peripheral portion may be spaced from the liquid outlet. The one or more apertures may be formed adjacent the peripheral portion.

The valve assembly may further comprise a liquid inlet. The valve assembly may be arranged to couple to a lid of a drinking cup with the liquid inlet located within the drinking cup when the drinking cup is joined to the lid. When suction is applied to a drinking spout of the drinking cup, the flexible valve face may be caused to lift off the liquid outlet, thereby allowing fluid in the cup to flow from the liquid inlet to the liquid outlet.

The flexible valve face may be arranged to lift off the liquid outlet in a substantially similar direction to a direction of fluid flow through the liquid outlet.

The one or more apertures of the flexible valve face may be located such that when the valve is closed (e.g. when the flexible member seals off the aperture in the valve seat) the apertures in the flexible valve face are not in fluid communication with the aperture formed in the valve seat. In particular, the one or more apertures of the valve face may be located substantially along a periphery of the flexible valve face. A central portion of the flexible valve face may seal off the aperture of the valve seat.

At least a portion of the flexible valve face may be held fixedly in a position (using any suitable means) such that the blocking portion is sealingly tensioned over the liquid outlet. An improved seal can be achieved as a result, as the tension in the flexible member assists in creating the seal.

The valve assembly may further comprise an air inlet and a flexible diaphragm arranged to seal off the air inlet. The valve assembly may be further arranged such that.

In a further aspect of the invention, there is provided a valve assembly for a drinking cup. The valve assembly comprises a valve seat having a liquid outlet formed therein. The valve assembly further comprises a flexible valve face having a blocking portion arranged to seal the liquid outlet so as to prevent fluid flow therethrough. A peripheral portion of the flexible valve face is fixed to the valve seat. This further aspect of the invention may further comprise any of the above-described features.

In a further aspect of the invention, there is provided a valve assembly as set out in the appended claims.

The first valve portion may comprise a part of the valve assembly against which the flexible diaphragm (such as a valve face or other flexible member) may seal against. Thus, the first valve portion may comprise a valve seat or similar valve component. The second valve portion may comprise a supporting frame or similar structural member arranged to hold or fix the flexible diaphragm relative to the first valve portion. The apertures may be formed in either the flexible diaphragm, or a portion of the supporting frame, or both.

The supporting frame may create tension in the flexible member so that the flexible member does not curve or bow when not pressed against the valve seat. The supporting frame may comprise one or more apertures formed therein for fluid flow. In particular, the supporting frame apertures may be designed such that fluids flows only when the flexible diaphragm is not blocking the liquid outlet.

The flexible diaphragm may be sealingly tensioned over the fluid outlet such that the flexible diaphragm may take on a curved or bowed appearance. The curve may be in a direction of fluid flow through the fluid outlet.

The second valve portion adjacent the flexible diaphragm may comprise a castellated or crenelated perimeter. The castellations or crenelations or other such projections may improve the adhesion of the flexible diaphragm to the supporting frame or other such element of the second valve portion.

In some embodiments, the valve assembly may be integrated into a drinking spout of a drinking vessel such that the valve assembly may take on a substantially vertical orientation. Thus, the movement of the diaphragm, and in particular the blocking portion, may be substantially perpendicular, or at least non-parallel, to the direction of fluid flow through the spout. This design may be more space-efficient.

The fluid outlet may comprise a bowed portion arranged to cause a corresponding bowing in the blocking portion when in the closed sealing position. This may serve to improve the seal between the blocking portion and the fluid outlet.

In a further aspect of the invention, there is provided a valve assembly for a drinking vessel. The valve assembly comprises a valve element having a supporting frame and a flexible diaphragm, the supporting frame dividing the flexible diaphragm into first and second diaphragm portions. The valve assembly further comprises a movable valve base having a fluid outlet formed therein. The valve base is arranged relative to the valve element such that the valve base contacts the supporting frame with the second diaphragm portion sealing the liquid outlet, and such that a tension in the second diaphragm portion is independent of movement of the valve base.

The first and second diaphragm portions may be integrally formed with the supporting frame, or may be individual components each attached to or otherwise coupled to the supporting frame.

The valve base may be arranged during movement to push against the supporting frame. In particular, the valve base may be arranged to move relative to the flexible diaphragm in a direction of fluid flow through the fluid outlet.

During movement of the valve base, a tension in the second diaphragm portion may remain substantially constant.

The valve base may be further arranged relative to the valve element such that a tension in the first diaphragm portion may depend on movement of the valve base. Thus, during movement of the valve base a tension in the first diaphragm portion may change.

The valve base may be integrated into a base of a drinking vessel.

BRIEF DESCRIPTION OF THE DRAWINGS

A preferred embodiment of the invention will now be described in connection with the accompanying drawings, of which:

FIG. 4b is a second perspective view the liquid diaphragm of FIG. 4a;

FIG. 5b is a second perspective view the air diaphragm of FIG. 5a;

FIGS. 6b and 6c show cross-sections of a hinge that may be used with the valve assembly of FIG. 6a;

FIGS. 10a-10g are perspective views of components of a valve assembly in accordance with embodiments of the invention;

FIGS. 12a and 12b are perspective views of a valve assembly in accordance with an embodiment of the invention, shown in its unfolded state;

FIG. 12c is a perspective view of a valve assembly in accordance with an embodiment of the invention, shown in its unfolded state;

FIGS. 13a-17b are side views of various valve assemblies integrated into bottles for venting;

DETAILED DESCRIPTION OF THE INVENTION

The present invention seeks to provide an improved valve assembly for a drinking cup. Whilst various embodiments of the invention are described below, the invention is not limited to these embodiments, and variations of these embodiments may well fall within the scope of the invention which is to be limited only by the appended claims.

Figure 1:
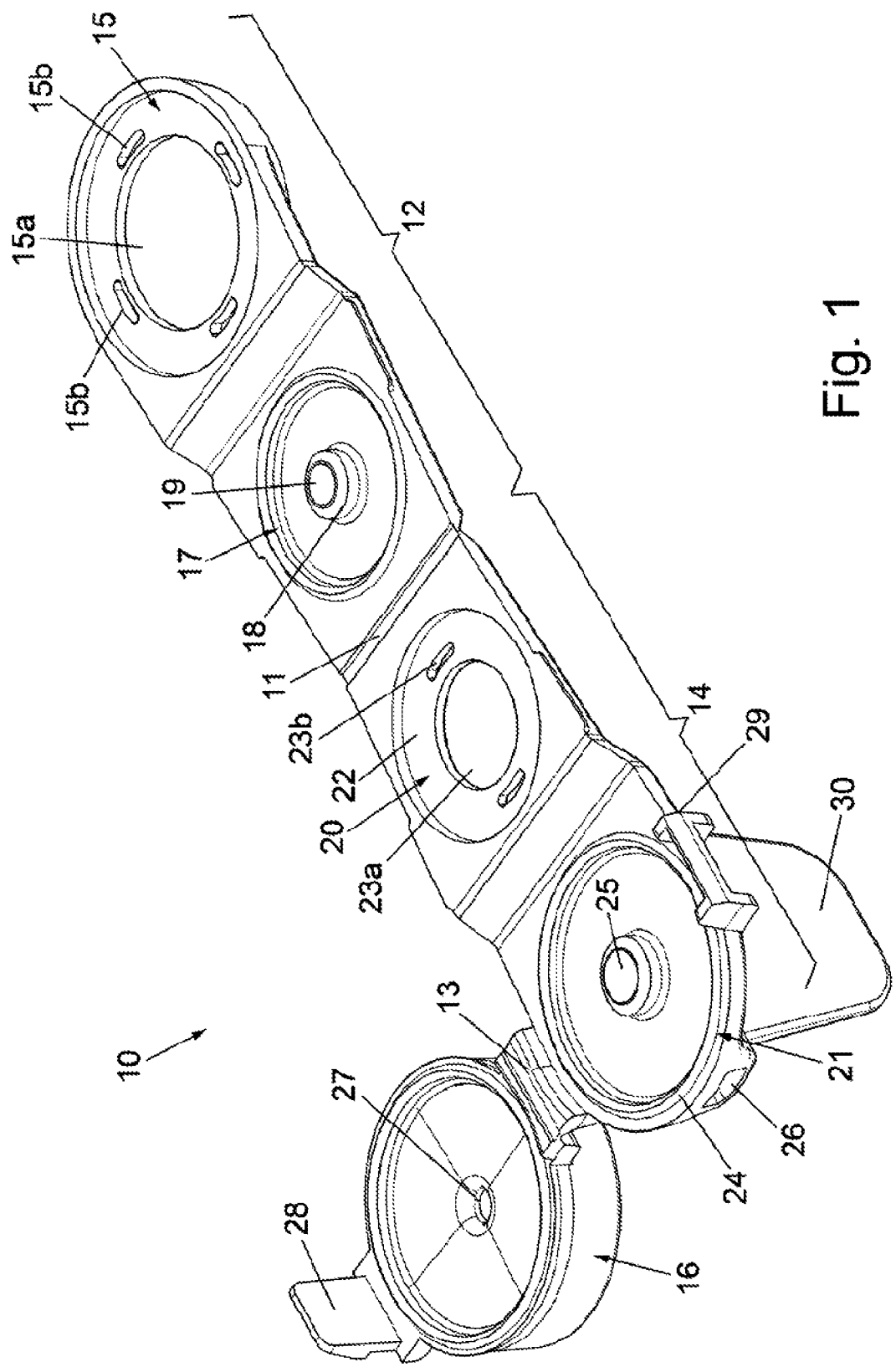
FIG. 1 is a first perspective view of a valve assembly in accordance with an embodiment of the invention, shown in its unfolded state.
Figure 2:
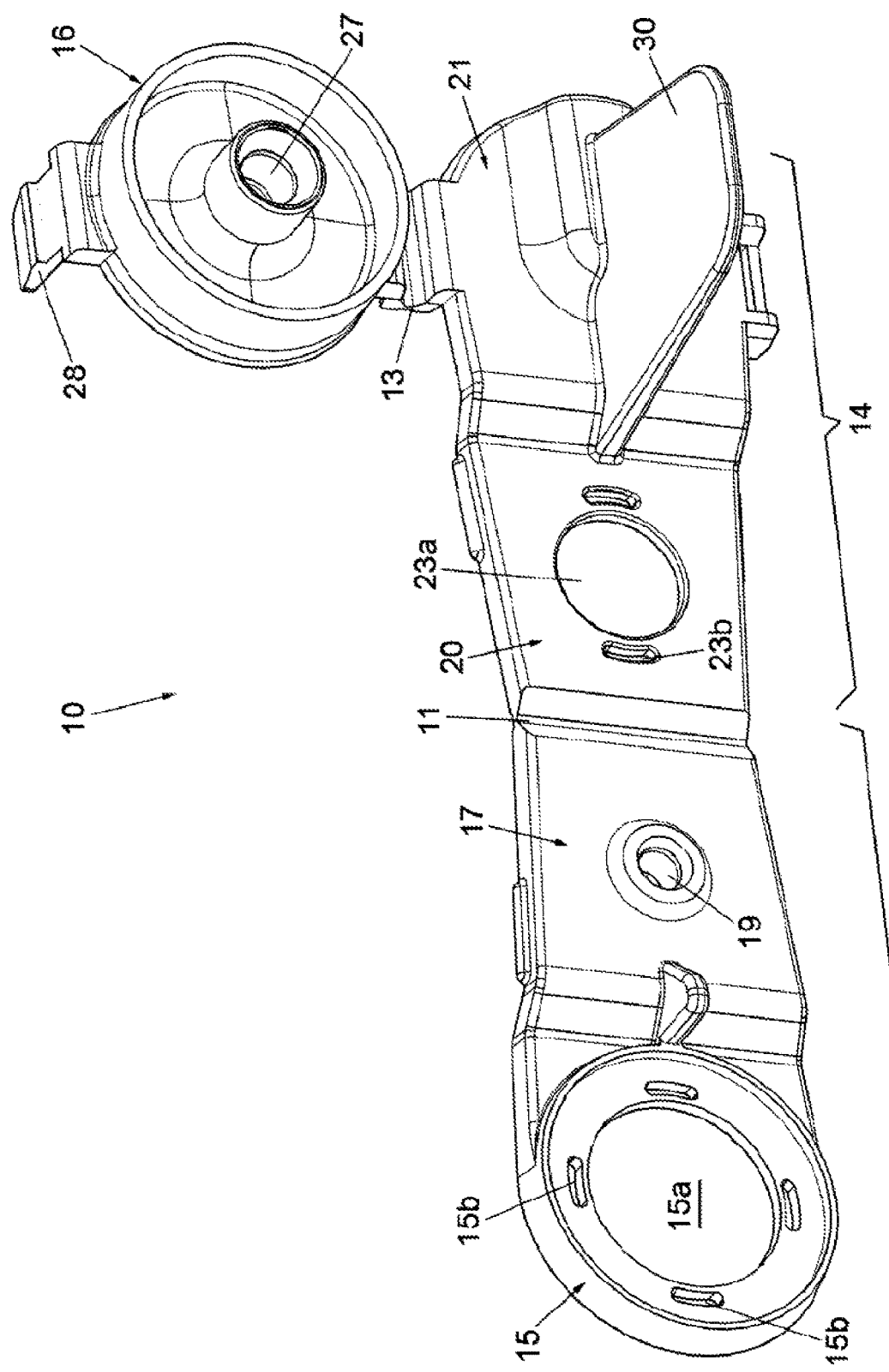
FIG. 2 is a second perspective view of the valve assembly of FIG. 1.

In accordance with a preferred embodiment of the invention, there is shown in FIG. 1 a valve assembly 10 suitable for use with a drinking cup, in particular an infant drinking cup. FIG. 2 shows an underside of assembly 10. In FIGS. 1 and 2, assembly 10 is shown in an unfolded or disassembled state.

Assembly 10 comprises three arms 12, 14 and 16. Arms 12 and 14 are joined to one another along fold line 11. Arm 14 is further joined to arm 16 by means of hinge 13. Arm 12 is in line with arm 14, whilst arm 16 extends perpendicularly away from arm 14 and in the same plane as arms 12 and 14. Whilst in the present embodiment arms 12 and 14 are shown to have a substantially elongate shape, the invention is not limited to such a shape and the arms may take any other shape provided they can still carry out their intended function, as will be described below in more detail.

At an end of arm 12 is located a first valve portion 15 having a central aperture 15a and four peripheral apertures 15b disposed around the outside of central aperture 15a. Apertures 15a and 15b are formed within a circular recess of arm 12 such that a fluid flow path extends from one side of arm 12 to the other side of arm 12, through each of apertures 15a and 15b. Adjacent valve portion 15 is located a third valve portion 17, comprising a nozzle 18.

Nozzle 18 comprises an aperture 19 such that a fluid flow path is formed from one side of arm 12 to the other side of arm 12, though aperture 19. Aperture 19 defines an air inlet 19a and air outlet 19b (see FIGS. 8 and 9). In particular, the fluid flow path extends from air inlet 19a of nozzle 18, on an upper side of arm 12 (FIG. 1), to air outlet 19b of nozzle 18, on a lower side of arm 12 (FIG. 2).

Arm 14 comprises second and fourth valve portions 21 and 20. Valve portion 20, adjacent fold line 11, comprises a circular recessed portion 22 with a central aperture 23a formed therein and two peripheral apertures 23b located on either side of central aperture 23a. Apertures 23a and 23b extend from one side of arm 14 such that a fluid flow path is formed from one side of arm 14 to the other side of arm 14, through each of apertures 23a and 23b.

Adjacent valve portion 20, at the opposite end of arm 14, is second valve portion 21. Valve portion 21 comprises a circular recessed portion with an upwardly extending sealing wall 24 along its periphery. Sealing wall 24 is topped with an angled portion in the shape of an inverted V (see FIGS. 8 and 9 for more detail). Within the centre of the recessed portion is a nozzle or liquid outlet 25. As will be described below in more detail, valve portion 21 further comprises a conduit extending from a liquid inlet 26 formed in arm 14 and extending to liquid outlet 25. On the underside of assembly 10 (best seen in FIG. 2) is located a fin-like projection or gripping member 30, extending away from arm 14. In other embodiments gripping member 30 may extend in other directions away from assembly 10.

Adjacent arm 14 and extending substantially perpendicularly away from arm 14 is arm 16. Arm 16 comprises a central aperture or bore 27 extending from one side of arm 16 to the opposite side of arm 16, such that a fluid flow path is formed from the one end of bore 27 to the other. Arm 16 comprises a locking member 28 engageable with a clasp 29 positioned on arm 14 and adjacent valve portion 21.

Assembly 10 is moulded as a single part using techniques known in the art, to obtain the shape and structure shown in FIGS. 1 and 2. The arrangement of the components of assembly 10 means that all features can be moulded in the line of draw such that assembly 10 can be moulded using a simple injection moulding tool. In the illustrated embodiment, liquid inlet 26 is not arranged in the line of draw but this could still be achieved, if required. Assembly 10 is preferably moulded using polypropylene, although other materials may be used, for example common rigid plastics capable of injection-moulding such as polyethylene, nylon or polyester.

Figure 3:
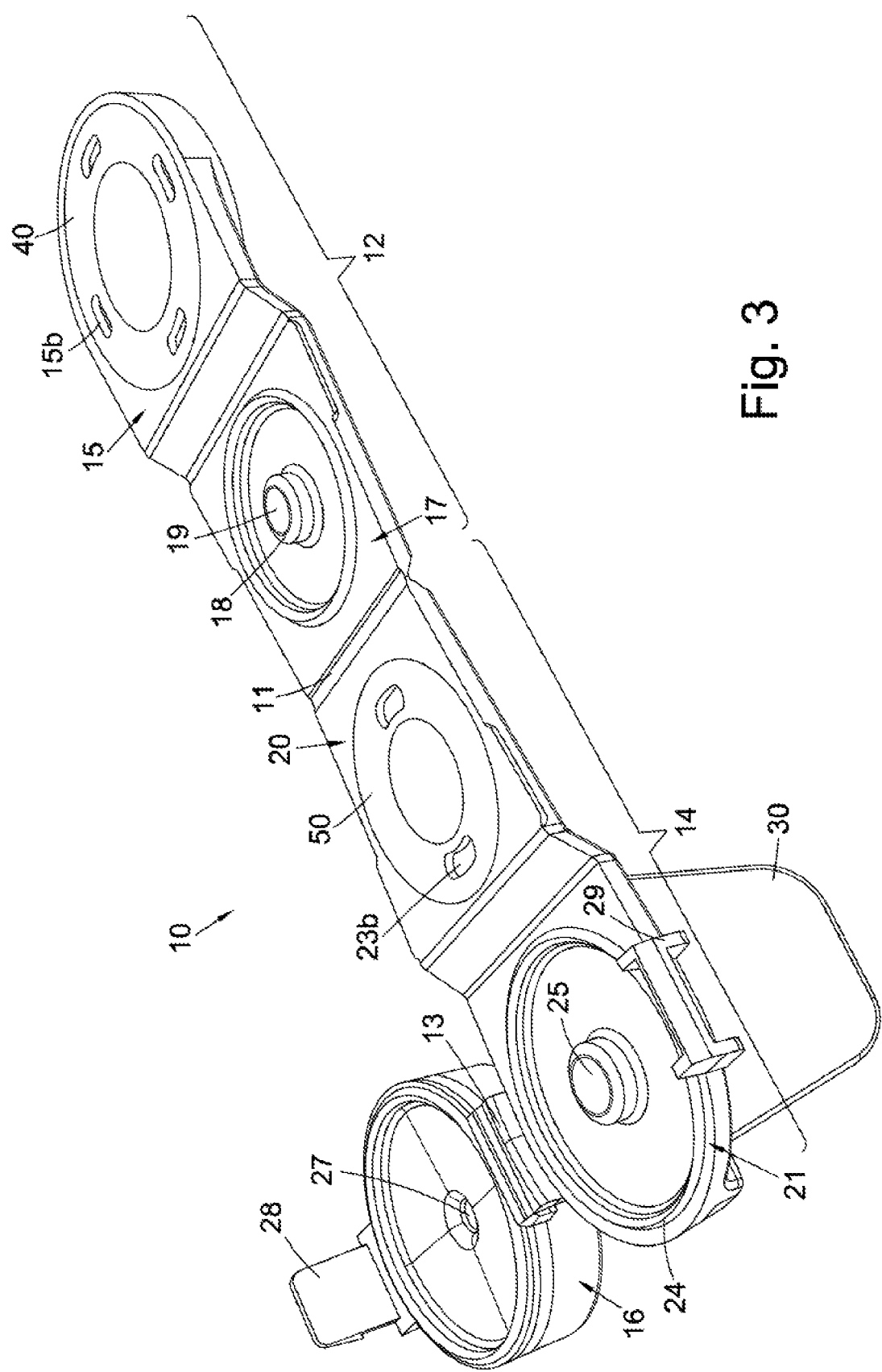
FIG. 3 is a perspective view of the valve assembly of FIG. 1, including the liquid and air diaphragms.

Once assembly 10 is moulded, a pair of flexible diaphragms, liquid diaphragm 40 and air diaphragm 50, are moulded in receptive positions on assembly 10. For simplest manufacturing, the pair of flexible diaphragms may be moulded immediately after moulding assembly 10, for example by known co-moulding techniques, or they may be moulded separately at a later time. In particular, liquid diaphragm 40 is moulded in position over valve portion 15 to acquire the shape shown in FIGS. 4a and 4b. Likewise, air diaphragm 50 is formed by moulding over valve portion 20 to acquire the shape shown in FIGS. 5a and 5b. FIG. 3 shows assembly 10 in its unfolded state following the moulding of liquid diaphragm 40 and air diaphragm 50 in their respective positions over valves portions 15 and 20.

Figure 4A:
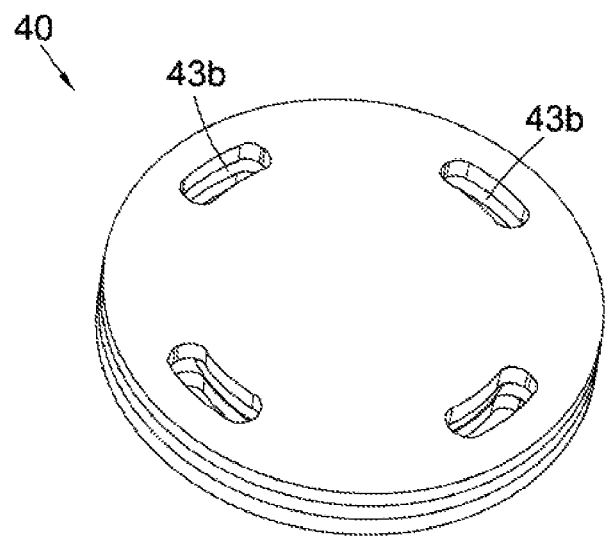
FIG. 4a is a first perspective view a liquid diaphragm in accordance with an embodiment of the invention.
Figure 4B:
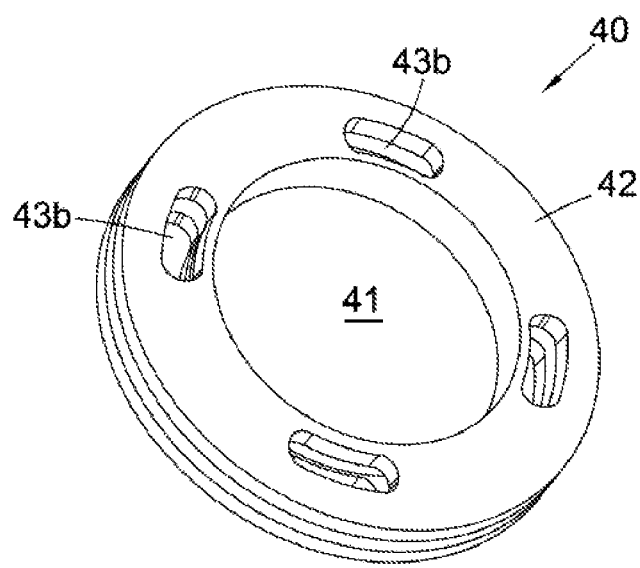

Both sides of liquid diaphragm 40 are shown in more detail in FIGS. 4a and 4b. Liquid diaphragm 40 comprises a double-layered disc-like shape with an internal recessed portion 41. Four equally-spaced apertures 43b extend from one side of liquid diaphragm 40 to its other side, each passing through a double-walled peripheral section 42. Other shapes of liquid diaphragm are contemplated within the scope of the invention. For example, fewer or more apertures 43b may be incorporated into liquid diaphragm 40. Liquid diaphragm 40 is made of a flexible material, preferably a thermoplastic elastomer.

Figure 5A:
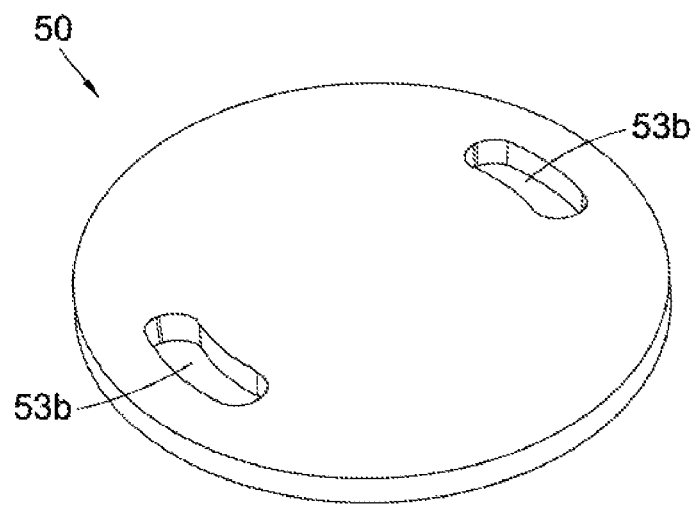
FIG. 5a is a first perspective view an air diaphragm in accordance with an embodiment of the invention.
Figure 5B:
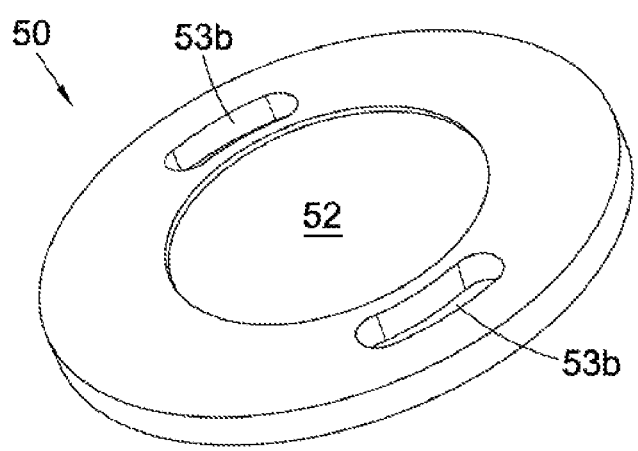

Air diaphragm 50 is illustrated in FIGS. 5a and 5b and comprises a disc-shaped flexible member having a pair of apertures 53b extending through it, on opposite sides of the member. Air diaphragm 50 further comprises a shallow, circular recessed portion 52 on one side of air diaphragm 50. Again, fewer or more apertures 53b may be incorporated into air diaphragm 50.

Returning to FIG. 3, as a result of the moulding, note that apertures 43b are aligned with apertures 15b, and that apertures 53b are aligned with apertures 23b. Note also that liquid diaphragm 40 and air diaphragm 50 are preferably moulded with their recessed portions, respectively 41 and 52, on the underside of the moulding, as shown in FIG. 3.

Fold line 11 and hinge 13 are known as 'live hinges', which are regions designed by their shape to be deformable and to allow relative movement between two components of the same moulded part.

Figure 6A:
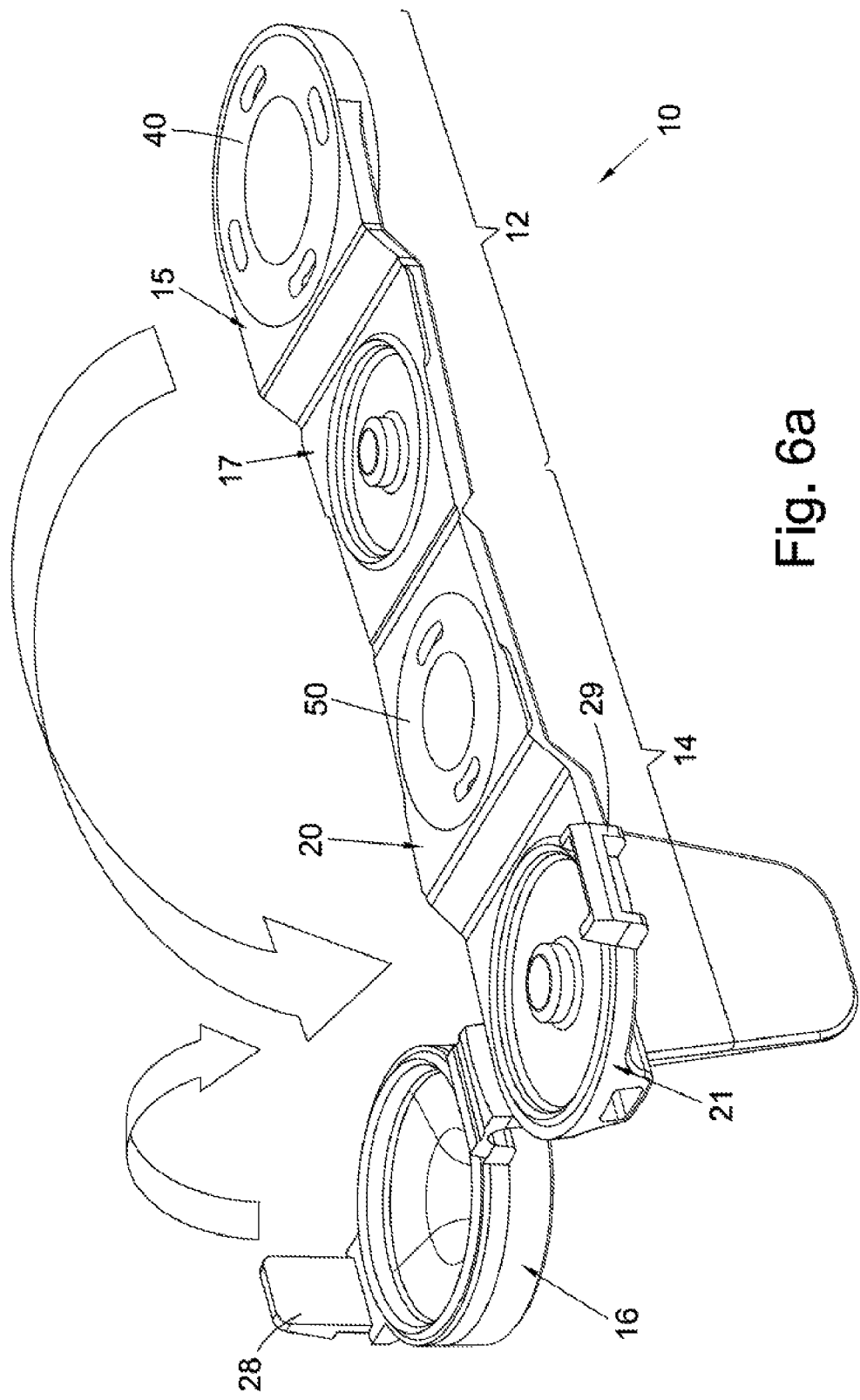
FIG. 6a is a perspective view of the valve assembly of FIG. 3 during folding.

In order to assemble valve assembly 10, assembly 10 must be moved from an unfolded state (as in FIGS. 1 and 2) to a folded, ready state. This is shown in more detail in FIG. 6a. Arm 12 is first moved relative to arm 14 by folding assembly 10 along fold line 11. When arm 12 is rotated through 180 degrees about fold line 11 and relative to arm 14, valve portion 15 is engaged with corresponding valve portion 21 such that liquid diaphragm 40 is sandwiched between arm 12 and arm 14. Similarly, valve portion 17 is engaged with corresponding valve portion 20 such that air diaphragm 50 is sandwiched between arm 12 and arm 14.

Figure 6B:
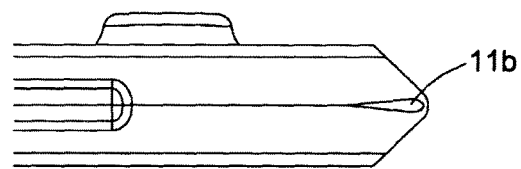
Figure 6C:
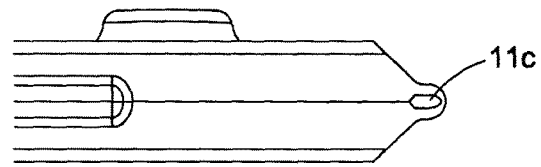

In some cases folding of assembly 10 may be difficult due to the restricted movement of fold line 11, and fold line 11 may be placed under stress when folded and may cause distortion of assembly 10 such that the seal formed around the air vent is broken. One solution is to have a longer, more flexible fold line or hinge that allows assembly 10 to be folded whilst ensuring arms 12 and 14 come together in parallel and without distortion. An example of such an elongate hinge 11c is shown in FIG. 6c, whilst FIG. 6b shows a shorter hinge 11b which may lead to distortion during folding.

Once arm 12 has been rotated relative to arm 14, arm 16 is then rotated using hinge 13 so as to bring it into engagement with the underside of arm 12. Arm 16 therefore engages with valve portion 15 and detachably locks arm 12 to arm 14 by means of locking member 28 engaging with clasp 29. Locking member 28 and clasp 29 may be based on known devices and may be chosen to be permanently closed, to prevent unfolding by users, or to be operable by users so that valve assembly 10 may be readily unfolded and re-folded e.g. for thorough cleaning. However, it may be possible to do away with arm 16 altogether by location of a suitable clasp on arm 12.

Figure 7:
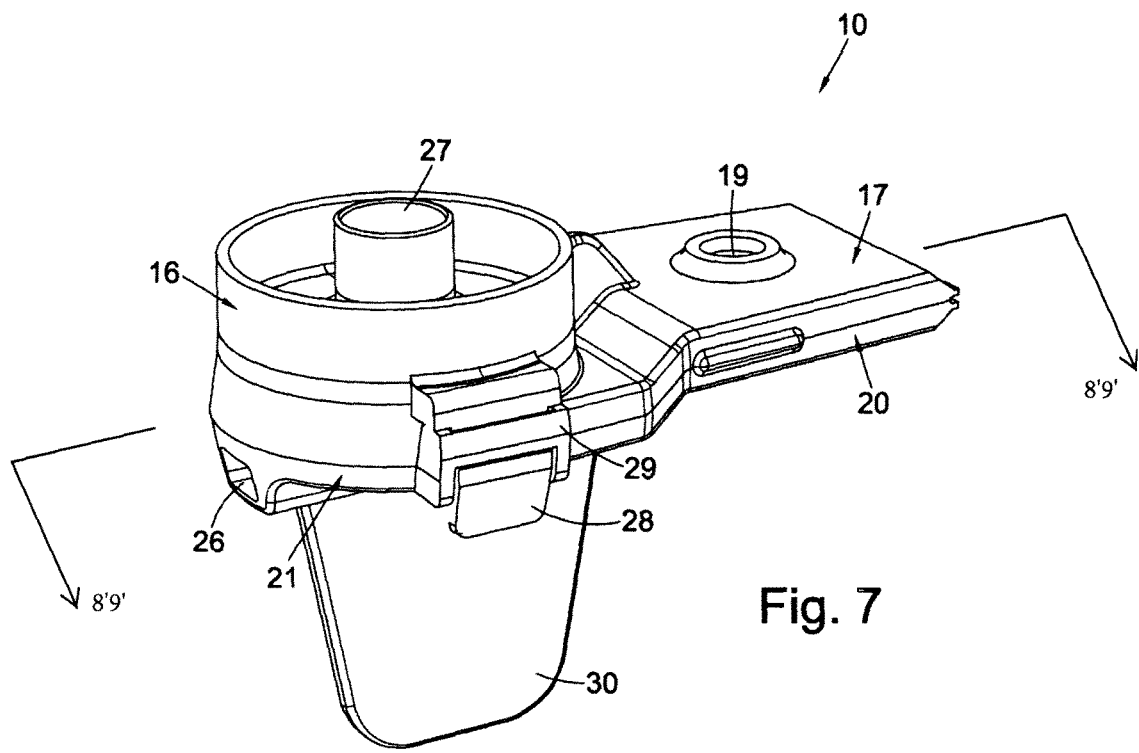
FIG. 7 is a perspective view of the valve assembly of FIG. 3, shown in its folded state.
Figure 8:
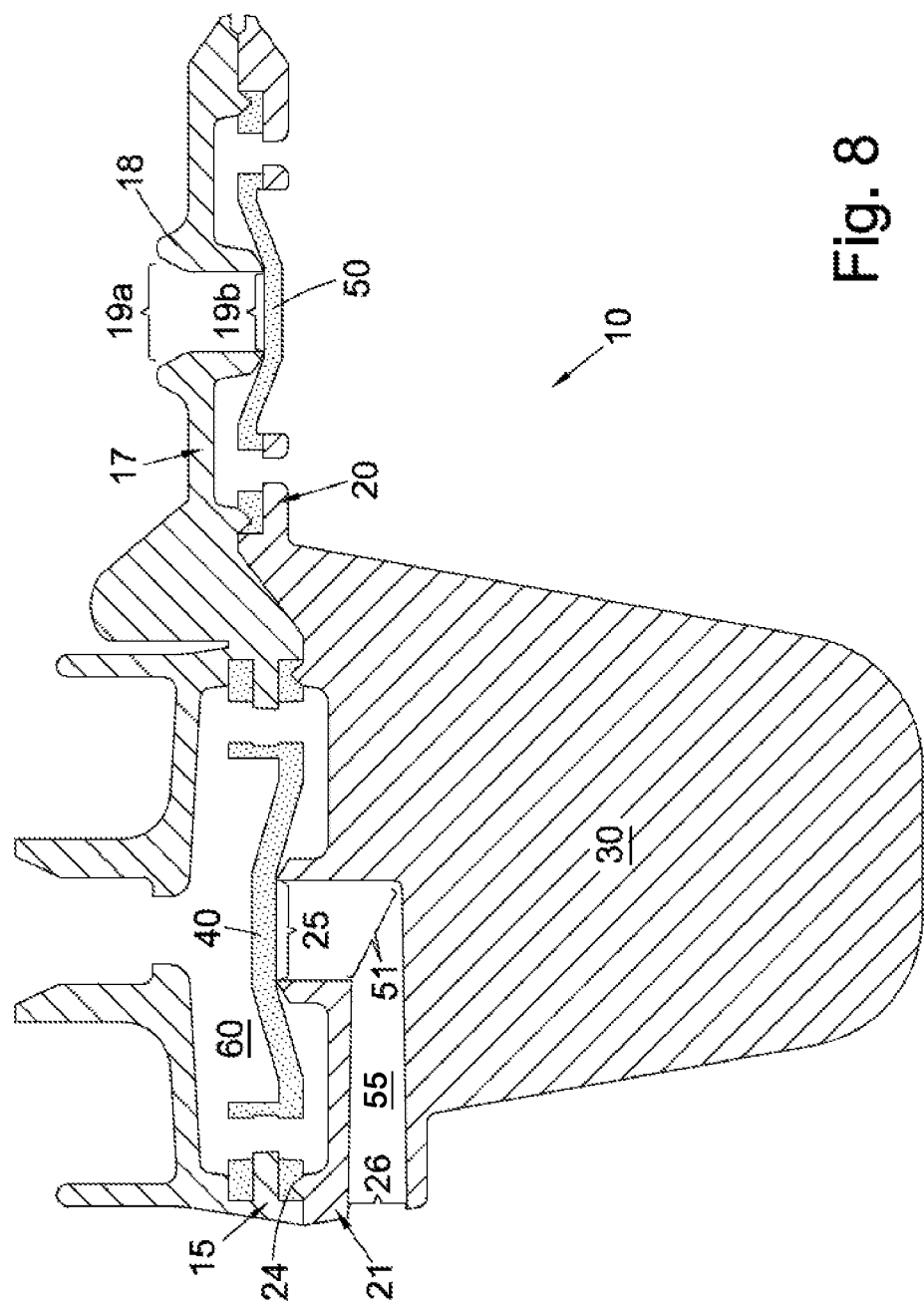
FIG. 8 is a cross-sectional view of the valve assembly of FIG. 7 with the liquid and air valves closed.
Figure 9:
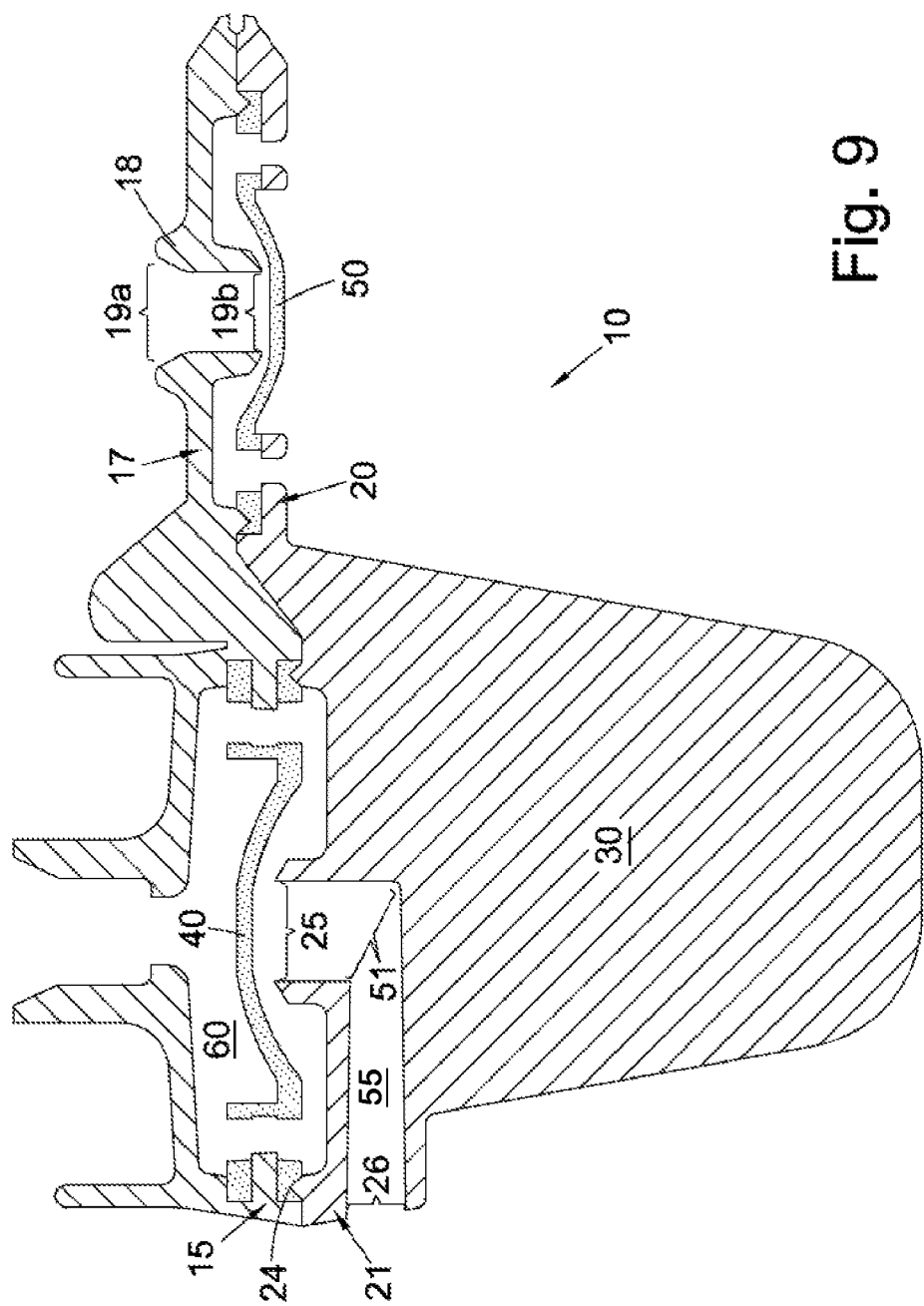
FIG. 9 is a cross-sectional view of the valve assembly of FIG. 7 with the liquid and air valves open.

In its folded state, ready for use, assembly 10 is shown in more detail in FIG. 7. A cross-section of assembly 10 in its folded state is shown in FIG. 8. As can be seen, air diaphragm 50 seals against nozzle 18 so as to close off or cap air outlet formed by aperture 19. When arm 12 is rotated relative to arm 14, nozzle 18 contacts the central portion of air diaphragm 50 and pushes the central portion downwards, thereby tensioning air diaphragm 50 around the rim of aperture 19. The periphery of air diaphragm 50 is held sealingly in place between valve portion 17 and valve portion 20. Apertures 23b of valve portion 20 are aligned with apertures 53b of air diaphragm 50.

Similarly, when arm 12 is rotated relative to arm 14, the central blocking portion of liquid diaphragm 40 contacts the rim of liquid outlet 25 in valve portion 21, which causes the central blocking portion of liquid diaphragm 40 to be pushed upwards relative to the periphery of liquid diaphragm 40. Thus, liquid diaphragm 40 is tensioned around the rim of liquid outlet 25 so as to seal off liquid outlet 25, and the central portion of liquid diaphragm 40 takes on the shape of an inverted V. The periphery of liquid diaphragm 40 is held sealingly in place by the engagement of valve portion 15 with valve portion 21. In particular, sealing wall 24 is resiliently biased into double-walled peripheral section 42 of liquid diaphragm 40 so as to form a seal. Apertures 15b of valve portion 15 are aligned with apertures 43b of liquid diaphragm 40.

Although not shown in FIG. 8, arm 16 serves to hold arm 12 in engagement with arm 14, thereby assisting with the engagement of valve portion 15 with valve portion 21, and valve portion 17 with the engagement of valve portion 20.

FIG. 8 also shows in more detail the conduit 55 extending from liquid inlet 26 to liquid outlet 25. Conduit 55 comprises a right-angle bend 51 such that bend 51 divides conduit 55 into a first horizontal section starting at liquid inlet 26, and a second vertical section ending at liquid outlet 25.

In use, valve assembly 10 in its folded state may be incorporated into the lid of a drinking cup, especially an infant drinking cup. For example, the lid may be arranged to receive and engage with valve assembly 10. By grasping gripping member 30, a user may more easily engage assembly 10 with the lid. Once assembly and lid are coupled, the lid may be screwed on or otherwise placed over a lidless drinking cup (such as a cup designed for engagement with the particular lid), such that liquid inlet 21 and gripping member 30 are positioned within the cup.

The lid preferably comprises a spout (or other apertured element) for drinking from. When a user sucks on the spout, pressure is reduced within a chamber 60 of assembly 10 (see FIGS. 8 and 9). The negative pressure causes the central blocking portion of liquid diaphragm 40 to lift off liquid outlet 25 and thereby break the seal between liquid diaphragm 40 and the rim of aperture forming liquid outlet 25. A fluid flow path is then formed extending from liquid inlet 26, past bend 51, through liquid outlet 25 and through apertures 15b and 43b of valve portion 21 and liquid diaphragm 40, to reach chamber 60. Fluid may then flow from chamber 60 out through the spout. For example, if a user sucks on the spout whilst the cup is up-ended, fluid may flow out from drinking cup and into the user's mouth.

Recessed portions 41 and 52 of liquid diaphragm 40 and air diaphragm 50 may vary in depth, or may even be absent, depending on the thickness of diaphragms 40 and 50. For example, the thickness of liquid diaphragm 40, and hence the depth of recessed portion 41, can be adjusted to best balance the need for liquid diaphragm 40 to respond to low suction levels, for example by being thin and easily stretched, with the desire to retain enough tension in liquid diaphragm 40 to reliably seal against liquid outlet 25. These characteristics may also be adjusted by changing the grade of elastomer for a harder or softer grade. Air diaphragm 50 may be adjusted in the same manner.

As fluid is sucked from the drinking cup, the pressure within the drinking cup decreases. This creates a negative pressure within drinking cup which causes air diaphragm 50 to lift off of air outlet 19 in a downwards manner, thereby breaking the seal between air diaphragm 50 and nozzle 18. A fluid flow path is then formed from air inlet 19a to air outlet 19b, such that air may flow from air inlet 19a, through air outlet 19b, and subsequently through apertures 23b and 53b of valve portion 20 and air diaphragm 50. Entry of air within drinking cup serves to equalise the pressure within drinking cup such that suction on spout is not impeded.

Figure 10E:
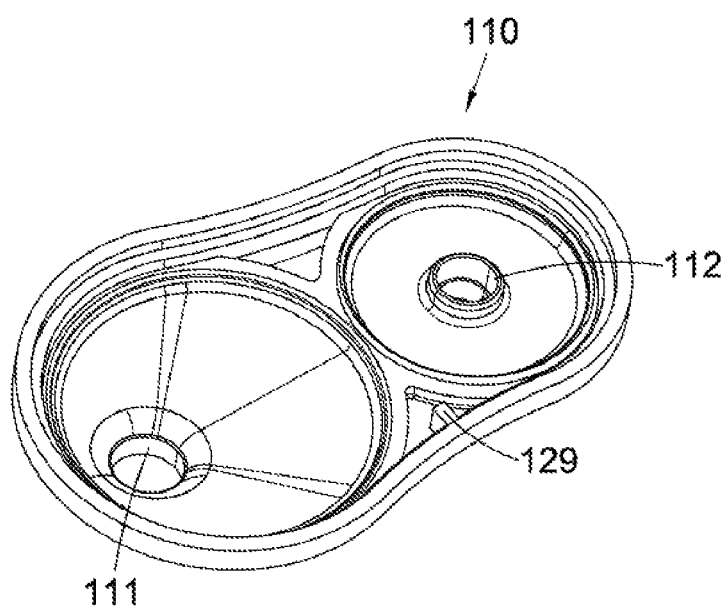
Figure 10F:
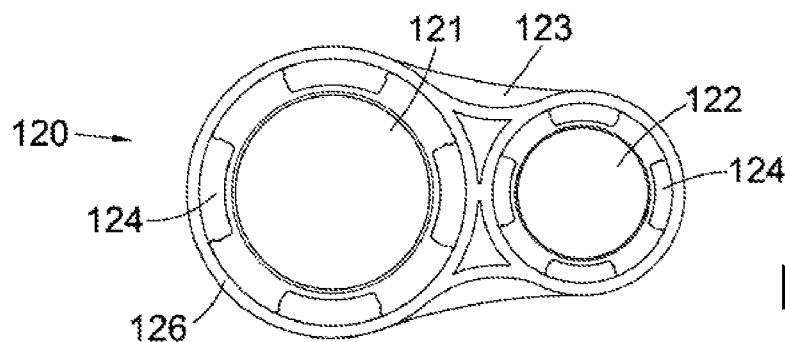
Figure 10G:
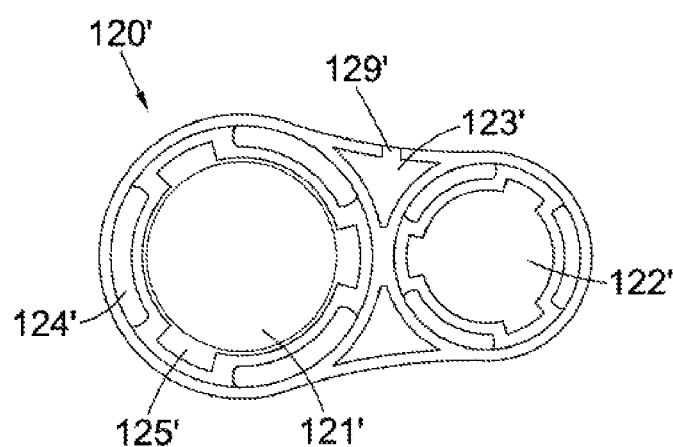
Figure 11:
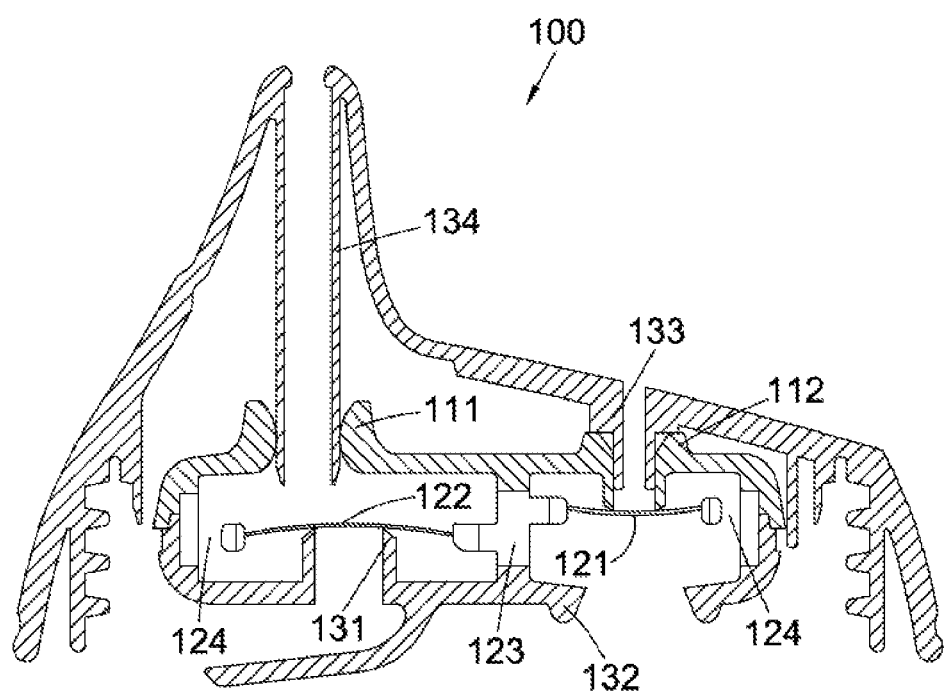
FIG. 11 is a cross-sectional view of the valve assembly of FIGS. 10a-10g with the liquid and air valves closed.

A further embodiment of a valve assembly in accordance with the present invention is shown in FIGS. 10a-11. Assembly 100 is similar to assembly 10, though, unlike assembly 10, assembly 100 may be formed of three individually moulded components: upper case 110, lower case 130 and intermediate frame 120 arranged to support two flexible diaphragms 121 and 122.

Upper case 110 comprises valve outlet 111 and air inlet 112, whilst lower case 130 comprises liquid outlet 131 and air outlet 132. As shown in FIG. 10c, intermediate frame 120 comprises two central apertures 127 and 128 formed within rigid frame portion 123. Outer projecting wall 126 runs substantially along the perimeter of intermediate frame 120. Although only one side of intermediate frame 120 is shown in FIG. 10c, the other side of intermediate frame 120 is identical. FIG. 10f shows intermediate frame 120 with diaphragms 121 and 122 received and held in respective central apertures 127 and 128.

A plurality of apertures or fluid outlets 124 are formed within rigid frame portion 123 of intermediate frame 120, adjacent central apertures 127 and 128. Thus, unlike apertures 43b and 53b of assembly 10, apertures 124 are formed within rigid frame portion 123 as opposed to within diaphragms 121 and 122 themselves.

FIG. 10d shows a modified version of intermediate frame 120. In this embodiment, in-between apertures 124 are located indents, projections, castellations or crenalations 125' formed within rigid frame portion 123'. Projections 125' allow for an increased surface area of diaphragms 121 and 122 to contact intermediate frame 120' so as to aid adhesion and improve the seal between the co-moulded parts, as can be seen in more detail in FIG. 10g.

Unlike intermediate frame 120 of FIG. 10d, intermediate frame 120' comprises a notched aperture 129' for locating a corresponding notch 129 in the underside of upper case 110, which can be seen in more detail in FIG. 10e. Without notched aperture 129', intermediate frame 120 would be symmetrical between its upper and lower faces, and there would be the possibility that intermediate frame 120' could be loaded into lower case 130 upside down and as a result diaphragm 121 may not engage and cap liquid outlet 131 (as described in more detail below). Notched aperture 129' assists intermediate frame 120' into lower case 130 with diaphragm 121 in the correct orientation.

Intermediate frame 120 (or intermediate frame 120') may be made from a rigid material over-moulded or co-moulded with a second, flexible material. In particular, relatively rigid frame portion 123 of intermediate frame 120 may be made from polypropylene, whilst diaphragms 121 and 122 may be made from a relatively flexible thermoplastic elastomer. Of course, other materials may be used if desired.

In order to assemble assembly 100, diaphragms 121 and 122 are first received in their respective central apertures 127 and 128 of intermediate frame 120/120'. Preferably, diaphragms 121 and 122 are over-moulded or co-moulded onto intermediate frame 120, either immediately after intermediate frame 120 is formed in the injection moulding tool, or in a later, separate moulding step. Intermediate frame 120 is then attached to lower case 130 such that diaphragm 121 caps liquid outlet 131 in lower case 130, and such that outer projecting wall 126 of intermediate frame 120 is received in a corresponding groove along the perimeter of lower case 130.

When attaching intermediate frame 120/120' to lower frame 130, notched aperture 129' points away from lower case 130. Upper case 110 is then attached to lower case 130 by engaging a groove along its perimeter with corresponding outer projecting wall 126 of intermediate frame 120. Notch 129 is received in notched aperture 129'. The preferred method of attachment between intermediate frame 120, lower case 130 and the upper case 110 is ultrasonic welding, but other methods could be employed, e.g. using adhesives, so long as they create a seal around each valve compartment.

As described above, intermediate frame 120 (or intermediate frame 120') may be made from two-part silicone. In particular, relatively rigid frame portion 123 of intermediate frame 120 may be made from hard grade silicone, whilst diaphragms 121 and 122 may be made relatively soft grade silicone. An advantage of this arrangement is that the relatively hard silicone of rigid frame portion 123 is generally not as hard as typical plastics, and so retains a small degree of compressibility. Hence, the assembly of valve assembly 100 may be simplified such that only upper case 110 need be welded to lower case 130, without requiring the step of welding intermediate frame 120 to lower case 130 or upper case 110. Instead, the sealing around each valve compartment may rely on compression of rigid frame portion 123 by upper and lower cases 110 and 130. The compression may be held by, for example, an ultrasonic weld around the perimeter of lower and upper cases 110 and 130, although other means could be used, e.g. using adhesives.

Once assembled, the structure and function of assembly 100 are largely identical as those of assembly 10. For example, an angled channel or bent conduit may lead from the outside of assembly 100 to liquid outlet 131, so as to minimise direct pressure from moving water, e.g. as generated by a child shaking the cup.

FIG. 11 shows a cross-sectional view of the demand valve assembly, generally referred to with the reference numeral 100. It is understood that valve assembly 100 can be used with various types of containers that contain a flowable material or substance. Thus, the shape of the container (not shown) can be arbitrary.

Once assembled, assembly 100 can be fitted to the underside of a cup lid, with air inlet tube 133 and liquid outlet tube 134 plugging respectively into air inlet 112 and valve outlet 111, as seen in FIG. 11. To assist effective sealing, diaphragms 121 and 122 are located such that liquid outlet 131 and air inlet 121 press on the underside of their respective diaphragms 121 and 122, slightly stretching and deforming them, causing diaphragms 121, 122 to appear convex with respect to air inlet 112 or liquid outlet 131.

In the above embodiments, liquid outlet 131 and flexible diaphragm 122 may be selectively closer to the level of liquid in a cup than the air inlet 112 and flexible membrane 121.

Alternative embodiments to assembly 100 are shown in FIGS. 12a-12c. In these embodiments, the valve assembly incorporates the foldability aspect described in connection with assembly 10. In FIGS. 12a and 12b, upper and lower cases 210 and 230 are moulded as a single, hinged piece. Intermediate frame 220 (with diaphragms 221 and 222) is then attached to lower case 230, as described above in relation to FIGS. 10a-10d. Upper case 210 is then folded over and attached to both lower case 230 and intermediate frame 220.

As seen in FIG. 10c, in an alternative embodiment valve assembly 200 may also be moulded as a single part. Upper case 210 and lower case 230 are hingedly connected to and located on respective sides of intermediate frame 220. To assemble valve assembly 200, intermediate frame 220 is folded over (with upper case 210) to locate into lower case 230. Intermediate frame 220 is then attached to lower case 230 (e.g. by sonic welding) before upper case 210 is folded over onto lower case 230 and intermediate frame 220, and attached to both.

In the above embodiments, the upper/lower cases and intermediate frame may be attached/folded over in different sequences, and the above-described sequences of assembly steps are merely exemplary and should not be construed as limiting.

The above embodiments describe a valve assembly that may be used for example with an infant drinking cup so as to prevent spillages. However, the valve concept may in addition be applied to baby bottles or similar such drinking cups or vessels. In particle, the valve assembly may therefore be used to vent a baby bottle when suction is applied to the bottle's teat by the infant. To be used with a baby bottle, the assembly may be simplified such that only an air valve need be provided—in other words the liquid valve portion of the valve assembly may be dispensed with.

FIGS. 13a-17b illustrate various embodiments in which the valve assembly of the present invention is incorporated into a baby bottle, in particular at the base of the bottle, to provide venting capability. As the infant draws liquid out of the bottle through suction at the bottle's teat, air may be automatically allowed to enter into the bottle at the base, via the valve assembly, to equalise the pressure and facilitate suction of the liquid out of the bottle.

FIGS. 13a and 13b illustrate an open system wherein the liquid product is allowed to flow around the valve, but is baffled from any shocks to avoid leaks. Inner 1310 is a twin shot component that uses a relatively soft diaphragm 1320 and bottle seal 1330. To assemble the parts, inner 1310 is pushed into base 1340 of bottle 1350. Base 1340 is then screwed or otherwise attached to bottle 1350. A relatively thicker section of soft material between inner 1310 and base 1340 enables greater tolerance of the final base position whilst maintaining the desired diaphragm interference.

The operation of the valve is similar to that described above in connection with valve assemblies 10, 100 and 200, with diaphragm 1320 lifting off first fluid inlet 1321 (the central spigot) when suction is applied to bottle 1350, Air may then flow into bottle 1350 through second fluid inlet 1322 and apertures 1323.

In FIGS. 14a and 14b, the valve comprises a two-part valve with a twin shot inner component 1410 that is spin welded onto bottle 1420, with base 1430 being able to screw on and off inner 1410. The flexible diaphragm comprises an outer portion 1450 with apertures 1480 formed therein, and a central portion 1440. Outer portion 1450 and central portion 1440 are separated by a ring 1460 (or diaphragm frame) of rigid material that is formed as part of the twin shot.

As base 1430 is screwed onto inner 1410, diaphragm frame 1460 is pushed up by central spigot 1470 allowing for a greater base assembly tolerance. The distance between diaphragm frame 1460 and central spigot 1470 is a controlled dimension. In other words, as base 1430 is screwed further onto inner 1410, the tension in outer portion 1450 of the flexible diaphragm will increase, whilst the tension in central portion 1440 will remain substantially constant due in part to diaphragm frame 1460 which isolates the central portion 1440 from upward movement of the push ring 1465.

The operation of the valve is similar to that described above in connection with valve assemblies 10, 100 and 200, with central portion 1440 lifting off the fluid inlet in central spigot 1470 when suction is applied to bottle 1420. Air may then flow into bottle 1420 through apertures 1480. Apertures 1480 may be slits or very small holes or similar in outer portion 1450 of the flexible diaphragm that substantially prevent liquid from within bottle 1420 from entering into base 1430.

Figure 15B:
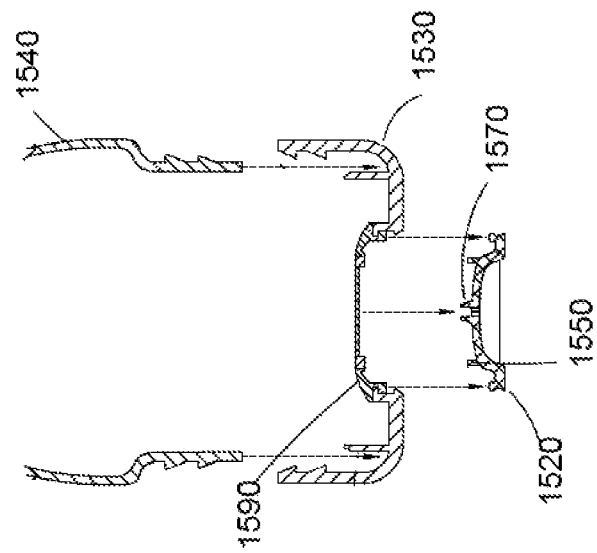
Figure 15A:
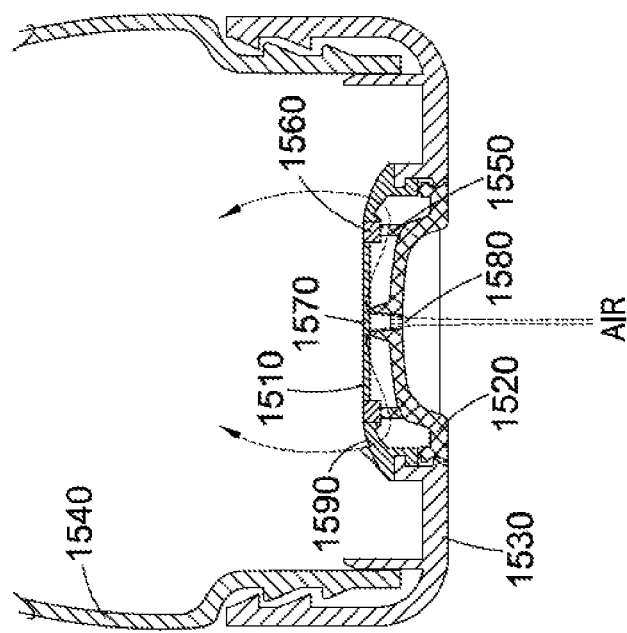

FIGS. 15a and 15b illustrate a further alternative embodiment of the air valve assembly. The valve uses two components: a twin shot base valve and base cover 1520. To assemble the parts, base cover 1520 is rotated to a lock position on the bottom of base 1530 and the assembled base is screwed onto bottle 1540. Base 1530 could also be spin welded onto bottle 1540, leaving only base cover 1520 to remove for cleaning. As base cover 1520 is locked into position, a push ring 1550 engages with diaphragm frame 1560 as described above in relation to the valve assembly of FIGS. 14a and 14b. Thus, the distance and relative heights from push ring 1550 to fluid inlet 1570 (e.g. the central spigot) is a controlled dimension. In other words, as base cover 1520 is screwed further onto base 1530, the tension in the outer portion of the flexible diaphragm will increase, whilst the tension in the central portion (within diaphragm frame 1560) will remain substantially constant.

The operation of the valve is similar to that described above in connection with valve assemblies 10, 100 and 200, with the diaphragm lifting off the fluid inlet 1570 when suction is applied to bottle 1540. Air may then flow into bottle 1540 through fluid inlet 1580 and through apertures 1590 in the outer portion of the diaphragm. Apertures 1590 may be slits or very small holes or similar as per apertures 1480 described above.

In FIGS. 16a and 16b, the valve comprises base 1610 and twin shot valve insert 1620. Valve insert 1620 is pressed into base 1610 which is then screwed onto bottle 1630. Valve insert 1620 can be removed with finger and thumb. Unlike the valve of FIGS. 13a and 13b, the valve is a closed system in which the liquid is kept away from the valve by flap 1680 that runs around valve insert 1620. Flap 1680 therefore serves to keep the liquid out of the cavity 1640 in base 1610. An inner seal allows diaphragm 1650 to operate with lower forces. The valve assembly uses a similar diaphragm frame to FIGS. 14a, 14b, 15a and 15b, engaging with a push ring on base 1610 to control the tension in the central portion of the diaphragm during screwing of base 1610 onto bottle 1630.

The operation of the valve is similar to that described above in connection with valve assemblies 10, 100 and 200, with the central portion of diaphragm 1650 lifting off the fluid inlet 1660 (e.g. the central spigot) when suction is applied to bottle 1630. Air may then flow into bottle 1630 through fluid inlet 1670 and flap 1680.

Figure 17B:
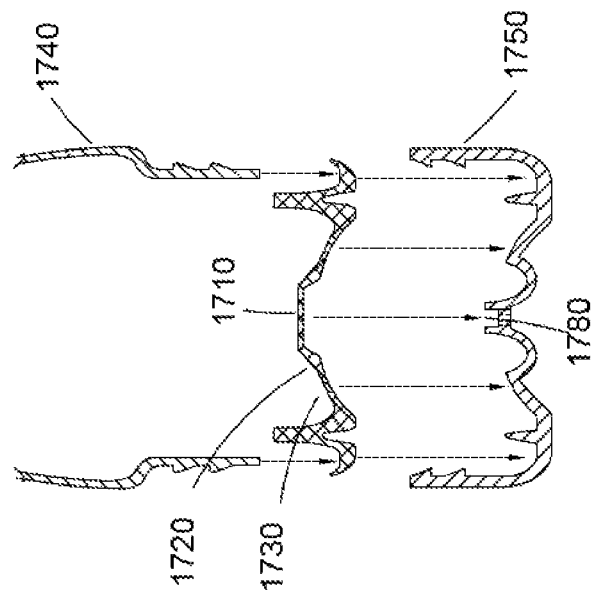
Figure 17A:
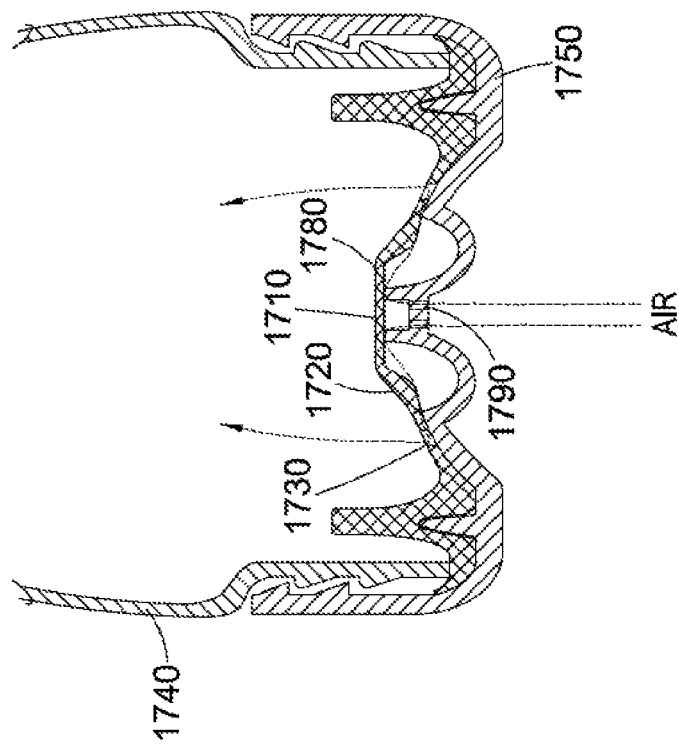

FIGS. 17a and 17b illustrate a further alternative embodiment of the air valve assembly in which a larger silicone diaphragm 1710 is used to keep the liquid out of the valve area and to provide a bottle/base seal. Central diaphragm 1710 works in the same way as the cartridge-type systems described above in relation to FIGS. 13a-16b, but the larger size of diaphragm 1710 makes it easier to open under suction. To maintain its shape, central diaphragm 1710 is circled by a thicker section 1720 of silicone or other similar material. Beyond this are a series of apertures 1730 that allow air into bottle 1740 from the lower chamber whilst sealing against base 1750 to keep the liquid away from the valve. To assemble bottle 1740, silicone diaphragm 1710 is pressed into base 1750 which is then screwed onto bottle 1740 sealing against the silicone, holding it in place.

The operation of the valve is similar to that described above in connection with valve assemblies 10, 100 and 200, with diaphragm 1710 lifting off first fluid inlet 1780 (the central spigot) when suction is applied to bottle 1740, Air may then flow into bottle 1740 through second fluid inlet 1790 and apertures 1730.

Further examples of valve assemblies in accordance with the present invention are shown in FIGS. 18a-21b.

Figure 18A:
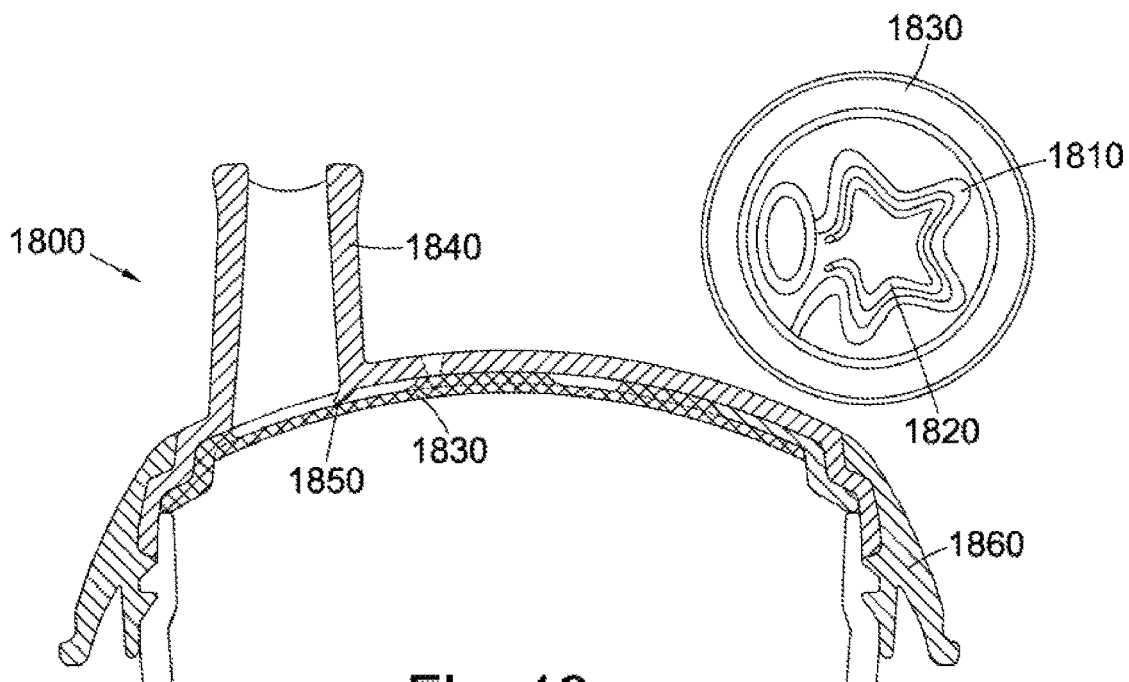
FIGS. 18a-21b are side views of various valve assemblies in accordance with alternative embodiments of the invention.
Figure 18B:
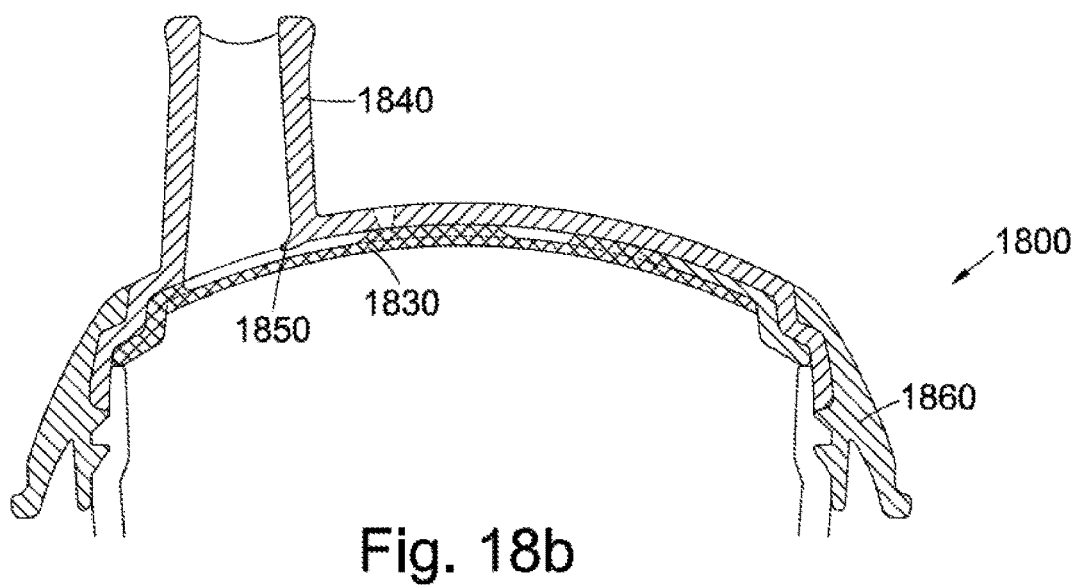

FIGS. 18a and 18b show a two-part valve 1800 using convoluted paths 1810 and 1820 to control the air intake and fluid flow. Rigid retaining plate 1830 pushes the elastomer mouthpiece 1840 through the top of the lid 1860 so they can be clamped together when the bottle is shut. Flap valves (such as flap valve 1850) in the elastomer act against retaining plate 1830, and open (as shown in FIG. 18b) when negative pressure is applied, allowing fluid around convoluted path 1810. Air returns along convoluted path 1820. The multiple U-bends of convoluted paths 1810 and 1820 prevent fluid from easily leaking out of mouthpiece 1840.

Figure 19A:
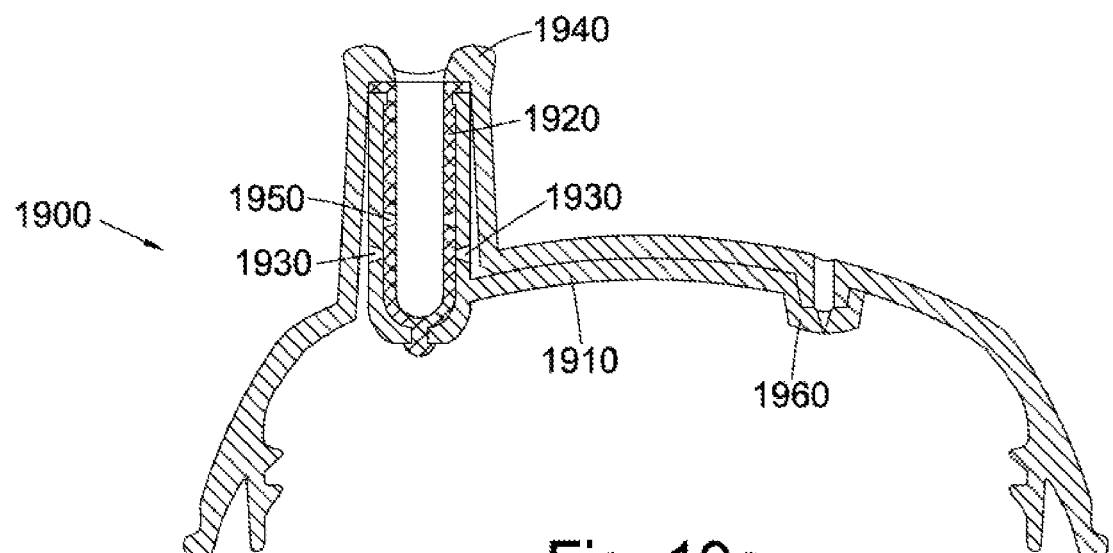
Figure 19B:
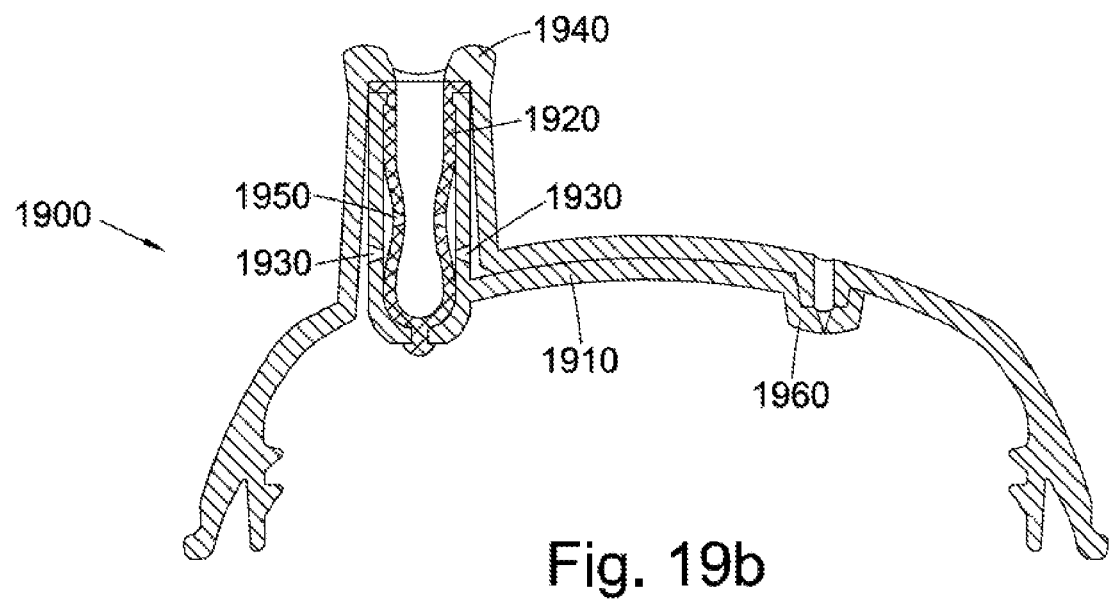

FIGS. 19a and 19b show a two-part valve 1900 using a flexible elastomer tube 1920 and a bi-injected retaining tube 1910. In its natural state (FIG. 19a), inner tube 1920 blocks the apertures 1930 in retaining tube 1910. When negative pressure is applied to mouthpiece 1940 (FIG. 19b), inner tube 1920 deforms, allowing fluid to pass through apertures 1930 and 1950. Retaining tube 1910 may also be attached to and integral with the air-intake valve 1960.

Figure 19C:
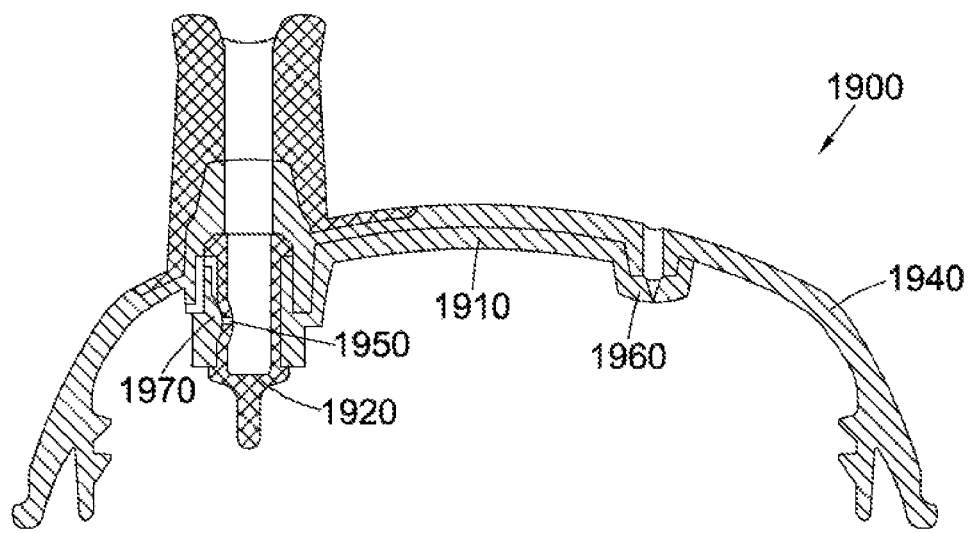
Figure 19D:
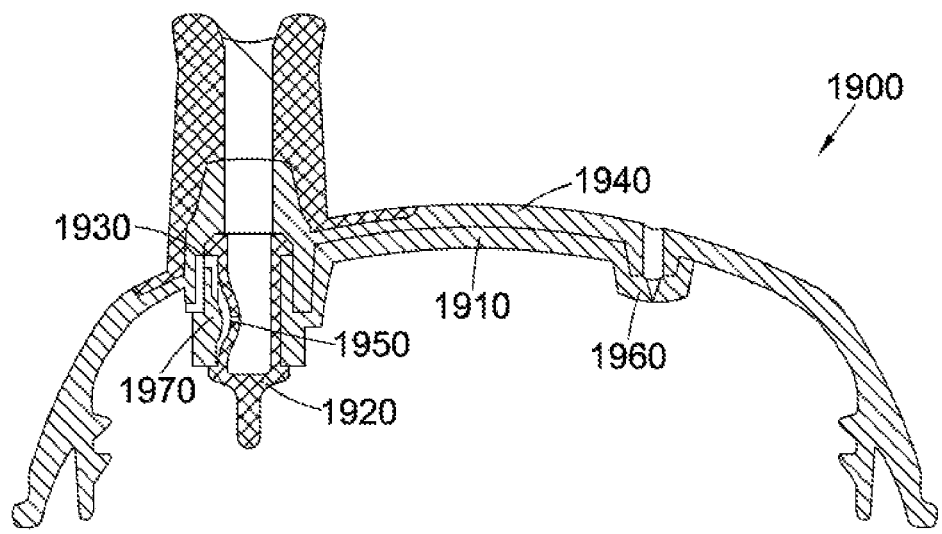

FIGS. 19c and 19d show a modified embodiment of valve 1900. Like features are identified using like reference numbers. In particular the valve now includes a bump or other protuberance 1970 to better seal against the hole 1950 in the flexible valve.

Figure 20A:
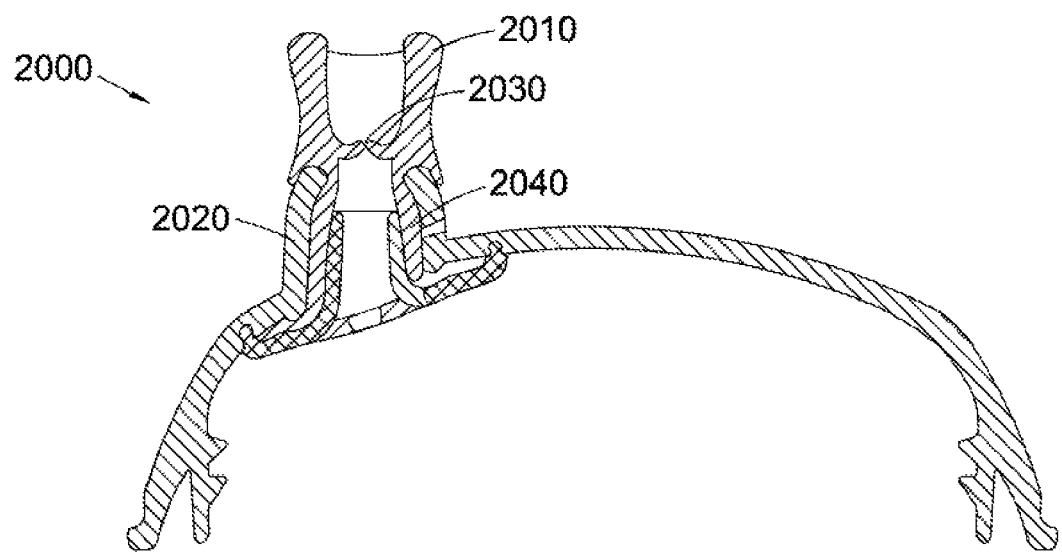
Figure 20B:
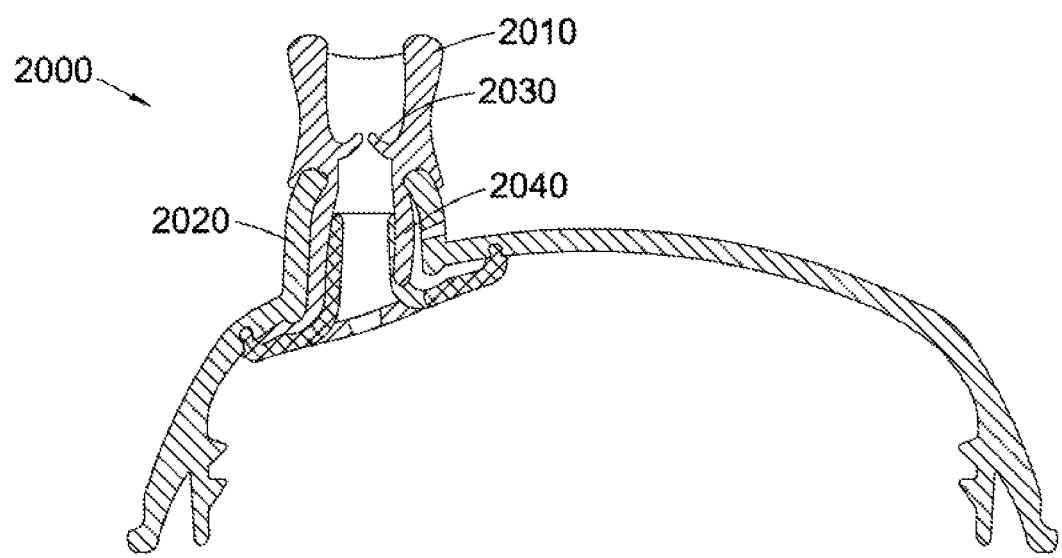

FIGS. 20a and 20b show a single-part valve 2000 whereby the valving operation is moved into a removable mouthpiece 2010. Mouthpiece 2010 is securely held in place in the cap 2020 but can be removed for cleaning. When the valve is open (as in FIG. 20b), fluid flows out of mouthpiece 2010 through an integral slit valve 2030 and air returns via an integral flap-style valve 2040 formed by mouthpiece 2010.

Figure 21A:
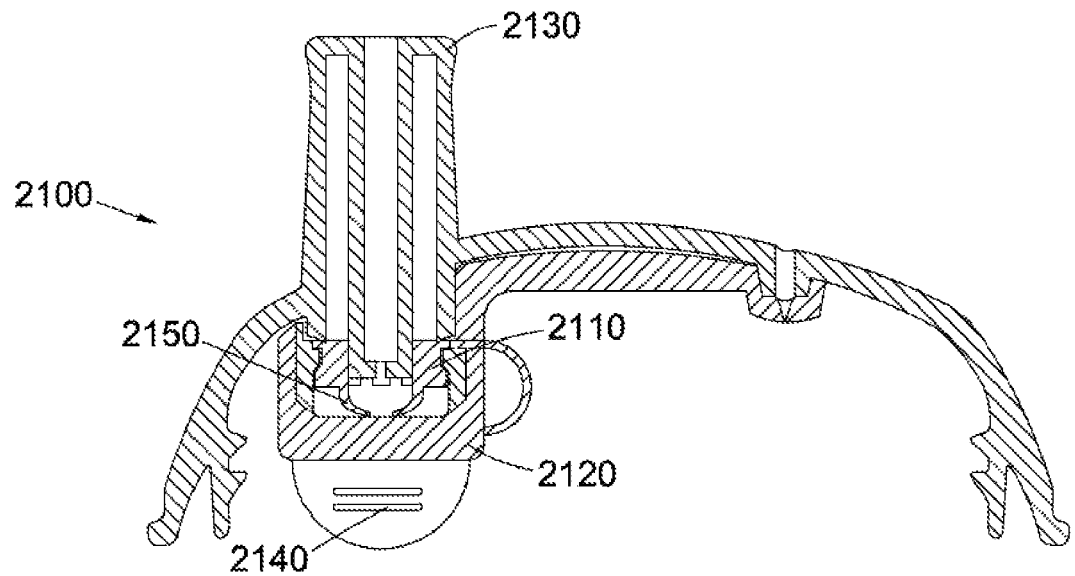
FIGS. 21c-21e show the valve assembly of FIGS. 21a and 21b in greater detail.
Figure 21B:
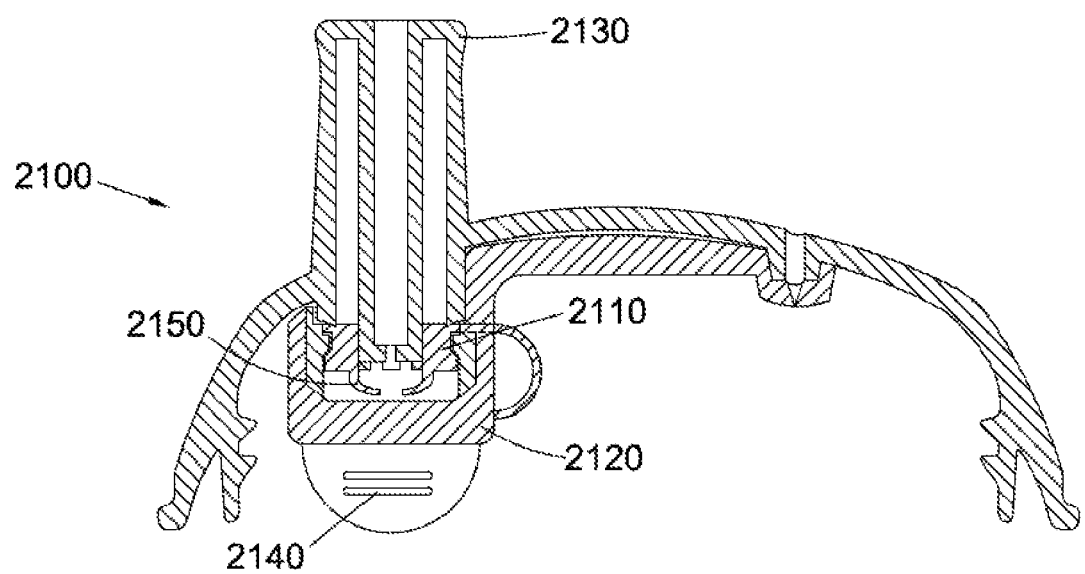
Figure 21C:
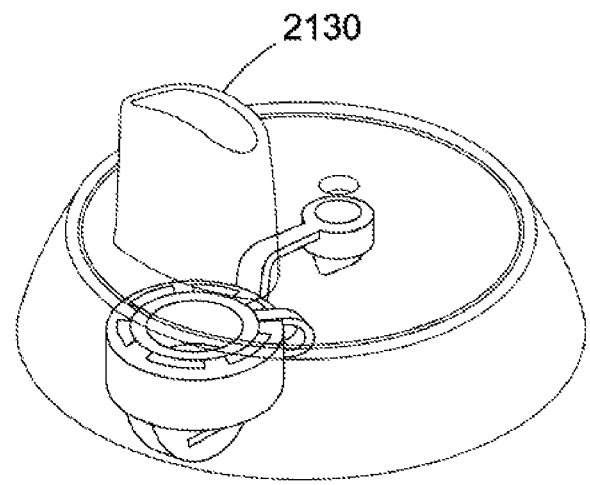
Figure 21D:
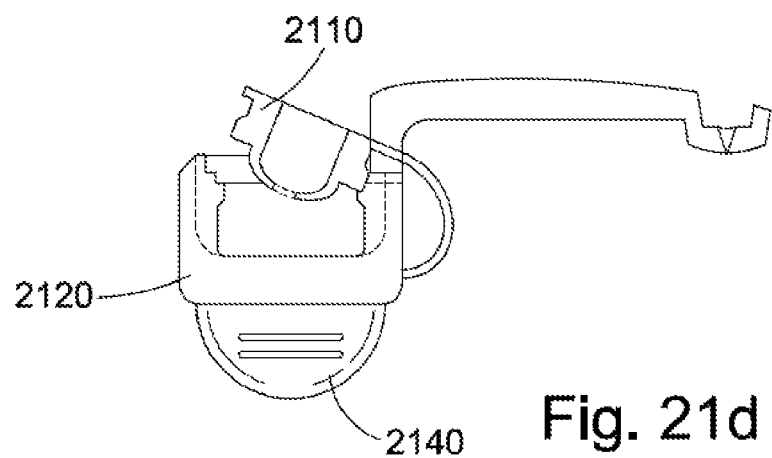
Figure 21E:
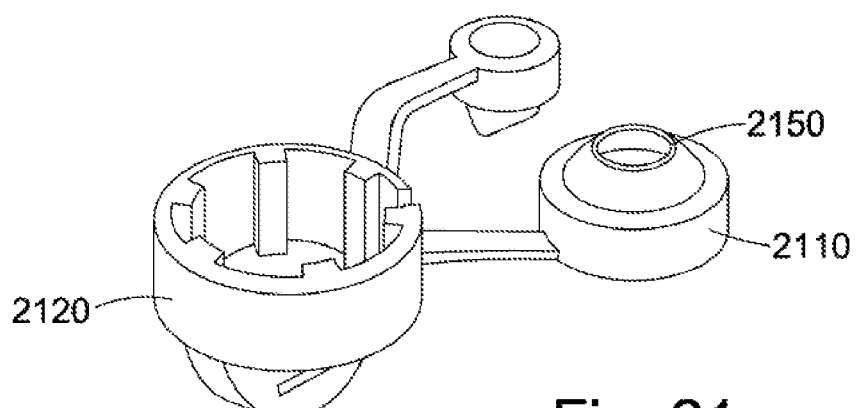

FIGS. 21a and 21b show a single-part valve 2100 that uses a rigid ring 2110 which folds and clips into a retaining plate 2120 around the mouthpiece 2130. A thin-walled elastomer 2150 forms the valve allowing fluid to flow to mouthpiece 2130 when negative pressure is applied (FIG. 21b). Instead of the elastomer 2150 shown in FIGS. 21a and 21b, collapsible bellows could be used instead. An easy-grip handle 2140 is formed on the bottom of retaining plate 2120 to assist removal. More details of rigid ring 2110 and retaining plate 2120 are shown in FIGS. 21c-21e, showing how ring 2110 fits into retaining plate 2120.

Whilst the invention has been described in connection with preferred embodiments, it is to be understood that the invention is not limited to these embodiments, and that alterations, modifications, and variations of these embodiments may be carried out by the skilled person without departing from the scope of the invention.

The invention claimed is:

1. A valve assembly for a drinking cup, the valve assembly comprising a single moulded assembly having a first arm having a first valve portion and a first flexible diaphragm and a second arm having a second valve portion, each valve portion having a respective aperture for fluid flow, wherein the first flexible diaphragm is moulded to the first valve portion as a single part, and wherein the valve assembly is foldable from an unfolded state to a folded state such that the first arm is foldable onto to the second arm, allowing the first flexible diaphragm of the first valve portion to be engaged with the second valve portion to form in the folded state a fluid flow path between the first and second apertures and wherein the first flexible diaphragm is adapted to block the fluid flow path between the first and second aperture.

2. The valve assembly of claim 1, wherein the valve assembly further comprises a third arm, and wherein the valve assembly is further foldable such that the third arm is foldable onto the first and second arms.

3. The valve assembly of claim 2, wherein the third arm comprises a locking mechanism for locking the first and second valve portions together in the folded state.

4. The valve assembly of claim 2, wherein the third arm comprises a third aperture, and wherein in the folded state the third arm engages at least one of the first and second valve portions to form a fluid flow path between the first, second and third apertures.

5. The valve assembly of claim 1, wherein in the folded state the first and second valve portions are detachably interlocked.

6. The valve assembly of claim 1, wherein a length of the fluid flow path is less than a width of the valve assembly.

7. The valve assembly of claim 1, wherein the flexible diaphragm comprises at least one aperture.

8. The valve assembly of claim 1, wherein the flexible diaphragm is coupled to the first and second arms such that in the folded state the flexible diaphragm acts to block the fluid flow path between the first and second apertures.

9. The valve assembly of claim 8, wherein in the folded state a blocking portion of the flexible diaphragm acts to block the fluid flow path between the first and second apertures, the blocking portion being spaced from an aperture formed within the flexible diaphragm.

10. The valve assembly of claim 1, wherein the first arm further comprises a third valve portion and the second arm further comprises a fourth valve portion, each of the third and fourth valve portions having a respective aperture for air flow.

11. The valve assembly of claim 10, wherein the valve assembly is foldable from an unfolded to a folded state such that the first arm is foldable onto the second arm, allowing the third valve portion to be engaged with the fourth valve portion to thereby form in the folded state an air flow path between the third and fourth apertures.

12. The valve assembly of claim 10, further comprising a second flexible diaphragm moulded to the fourth valve portion.

13. The valve assembly of claim 12, wherein the second flexible diaphragm comprises at least one aperture.

14. The valve assembly of claim 12, wherein the second flexible diaphragm is coupled to the first and second arms such that in the folded state the second flexible diaphragm acts to block the air flow path between the third and fourth apertures.

15. The valve assembly of claim 14, wherein in the folded state a blocking portion of the second flexible diaphragm acts to block the air flow path between the third and fourth apertures, the blocking portion being spaced from an aperture formed within the second flexible diaphragm.

16. The valve assembly of claim 12 wherein the second flexible diaphragm has an edge and the edge of the second flexible diaphragm is moulded to the second valve portion.

17. The valve assembly of claim 1 wherein the first flexible diaphragm has an edge and the edge of the first diaphragm is moulded to the first valve portion.

18. A valve assembly for a drinking cup, the valve assembly comprising a single assembly having a first arm having a first valve portion and a first flexible diaphragm and a second arm having a second valve portion, each valve portion having a respective aperture for fluid flow, wherein the first flexible diaphragm is singularly assembled to the first valve portion as a single part, and wherein the valve assembly is foldable from an unfolded state to a folded state such that the first arm is foldable onto to the second arm, allowing the first flexible diaphragm of the first valve portion to be engaged with the second valve portion to form in the folded state a fluid flow path between the first and second apertures and wherein the first flexible diaphragm is adapted to block the fluid flow path between the first and second apertures.

19. The valve assembly of claim 18, wherein the valve assembly further comprises a third arm, and wherein the valve assembly is further foldable such that the third arm is foldable onto the first and second arms.

\* \* \* \* \*

UNITED STATES PATENT AND TRADEMARK OFFICE
CERTIFICATE OF CORRECTION

PATENT NO. : 10,398,241 B2  
APPLICATION NO. : 14/570476  
DATED : September 3, 2019  
INVENTOR(S) : Richard Parker et al.

Page 1 of 1

It is certified that error appears in the above-identified patent and that said Letters Patent is hereby corrected as shown below:

In the Specification

Column 6, Lines 55-56, after "may" and before "impermeable", insert --be--
Column 7, Lines 24-25, delete "The valve assembly may be further arranged such that."
Column 9, Line 57, delete "though" and insert --through--
Column 16, Line 63, delete "1740," and insert --1740.--

In the Claims

Column 17, Line 60 (Claim 1) delete "onto to" and insert --to--

Signed and Sealed this  
Twenty-ninth Day of October, 2019

Andrei Iancu  
*Director of the United States Patent and Trademark Office*